United States Patent
Chaudhary et al.

(10) Patent No.: US 11,912,852 B2
(45) Date of Patent: Feb. 27, 2024

(54) PROCESS FOR MAKING CROSSLINKED CABLE INSULATION USING HIGH MELT STRENGTH ETHYLENE-BASED POLYMER MADE IN A TUBULAR REACTOR AND OPTIONALLY MODIFIED WITH A BRANCHING AGENT

(71) Applicant: Dow Global Technologies LLC, Midland, MI (US)

(72) Inventors: Bharat I. Chaudhary, Collegeville, PA (US); Christopher R. Eddy, Freeport, TX (US); Sarat Munjal, Freeport, TX (US); Kalyan Sehanobish, Midland, MI (US); Hayley Brown, Freeport, TX (US); John O. Osby, Freeport, TX (US); Jose Ortega, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/315,338

(22) Filed: May 10, 2023

(65) Prior Publication Data
US 2023/0303815 A1 Sep. 28, 2023

Related U.S. Application Data

(62) Division of application No. 17/091,187, filed on Nov. 6, 2020, now Pat. No. 11,674,028, which is a division of application No. 15/580,362, filed as application No. PCT/US2016/034000 on May 25, 2016, now Pat. No. 10,844,209.

(60) Provisional application No. 62/180,706, filed on Jun. 17, 2015.

(51) Int. Cl.
| | |
|---|---|
| C08L 23/26 | (2006.01) |
| C08L 23/08 | (2006.01) |
| C08F 2/01 | (2006.01) |
| C08J 3/24 | (2006.01) |
| H01B 3/30 | (2006.01) |
| C08K 5/14 | (2006.01) |

(52) U.S. Cl.
CPC .............. *C08L 23/26* (2013.01); *C08F 2/01* (2013.01); *C08J 3/24* (2013.01); *C08K 5/14* (2013.01); *C08L 23/0846* (2013.01); *H01B 3/307* (2013.01); *C08F 2500/11* (2013.01)

(58) Field of Classification Search
CPC .......... C08F 10/02; C08F 36/20; C08F 36/14; C08F 2810/20
See application file for complete search history.

(56) References Cited

U.S. PATENT DOCUMENTS

| | | | |
|---|---|---|---|
| 4,018,852 A | 4/1977 | Schober | |
| 5,346,961 A | 9/1994 | Shaw et al. | |
| 5,844,045 A | 12/1998 | Kolthammer et al. | |
| 5,869,575 A | 2/1999 | Kolthammer et al. | |
| 6,063,845 A * | 5/2000 | Nylander | H01B 7/2813 |
| | | | 524/308 |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 7,820,776 B2 | 10/2010 | Neuteboom et al. | |
| 9,120,880 B2 | 9/2015 | Zschoch et al. | |
| 9,150,681 B2 | 10/2015 | Osby et al. | |
| 9,228,036 B2 | 1/2016 | Berbee et al. | |
| 9,238,700 B2 | 1/2016 | Littmann et al. | |
| 9,334,348 B2 | 5/2016 | Berbee et al. | |
| 9,394,389 B2 | 7/2016 | Berbee et al. | |
| 9,683,058 B2 | 6/2017 | Berbee et al. | |
| 2002/0169238 A1 | 11/2002 | Caronia et al. | |
| 2008/0125553 A1* | 5/2008 | Conrad | C08F 110/02 |
| | | | 526/348 |
| 2008/0242809 A1 | 10/2008 | Neuteboom et al. | |
| 2011/0100675 A1 | 5/2011 | Person et al. | |
| 2011/0172367 A1 | 7/2011 | Backer et al. | |
| 2012/0305284 A1* | 12/2012 | Nilsson | C08F 10/02 |
| | | | 174/110 SR |
| 2013/0284486 A1 | 10/2013 | Nilsson et al. | |
| 2014/0187730 A1 | 7/2014 | Flory et al. | |
| 2015/0197590 A1 | 7/2015 | Osby | |
| 2017/0186515 A1 | 6/2017 | Nilsson et al. | |
| 2019/0013115 A1 | 1/2019 | Nilsson et al. | |

FOREIGN PATENT DOCUMENTS

| | | |
|---|---|---|
| WO | 2014/003837 A1 | 1/2014 |
| WO | 2014/081458 A1 | 5/2014 |

OTHER PUBLICATIONS

T. Williams et al., Polymer Letters, vol. 6, 1968, pp. 621-624.

* cited by examiner

*Primary Examiner* — Robert C Boyle
(74) *Attorney, Agent, or Firm* — Boyle Frederickson SC

(57) ABSTRACT

An insulated wire or cable is made by a process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene-based polymer made in a tubular reactor, and
  (2) a peroxide, and
(B) crosslinking the high melt strength ethylene-based polymer.

7 Claims, 1 Drawing Sheet

PROCESS FOR MAKING CROSSLINKED CABLE INSULATION USING HIGH MELT STRENGTH ETHYLENE-BASED POLYMER MADE IN A TUBULAR REACTOR AND OPTIONALLY MODIFIED WITH A BRANCHING AGENT

FIELD OF THE INVENTION

This invention relates to cable insulation. In one aspect the invention relates to a process for making cable insulation using a high melt strength ethylene-based polymer made in a tubular reactor and optionally modified with a branching agent, e.g., poly(propylene glycol) allyl ether methacrylate (PPG AEMA). In another aspect, the invention relates to a process for making cable insulation using a high melt strength ethylene-based polymer made in a tubular reactor and having a low dissipation factor (DF).

BACKGROUND OF THE INVENTION

In the case of many ethylene-based polymers, particularly low density polyethylene (LDPE), the melt strength of the polymer decreases as its viscosity decreases (melt index increases). For peroxide crosslinkable power cable insulations, branching agents or technologies that enable a reduction in melt viscosity of the polymer without compromising melt strength are desirable as these enable one or more of: (a) faster extrusion; (b) longer run lengths; and (c) lower head-pressures with adequate sag resistance during extrusion to enable use of finer screens to minimize defects. Also desirable are ethylenic polymers that exhibit increased melt strength at a given melt index or shear viscosity, for increased sag-resistance during extrusion. These attributes are particularly useful for low-, medium-, high- and extra high-voltage cables. Although crosslinkability of polymers is affected by their molecular architectures (molecular weight and polydispersity), it can also be substantially influenced by incorporation of various additives in the fully formulated polymer composition. Low dissipation factor is a key performance requirement for the compositions used to make the insulation sheaths of low-, medium-, high- and extra high-voltage cables, and modified (branched) ethylene-based polymer needs to be comparable in this regard to the performance of conventional ethylene-based polymer (particularly LDPE).

Power cables used in electrical distribution and transmission applications are classified by the International Electrotechnical Commission as low-voltage (less than 1 kV), medium-voltage (1 kV up to 30 kV), high-voltage (above 30 kV up to 150 kV) and extra high-voltage (above 150 kV). The medium- to extra high-voltage cable cores are made by triple extrusion processes in which conductors are coated with peroxide-containing polyolefin compositions designed for the following layers: semiconductive conductor shield, electrical insulation (the thickest polymer layer) and semiconductive insulation shield. Extrusion of the polymer compounds is typically done at temperatures below 140° C., to prevent premature crosslinking ("scorch"), and the coated conductor subsequently passes through a continuous vulcanization tube operating at temperatures up to about 300° C. where the peroxide is completely decomposed to enable crosslinking of the polymers. The insulation thickness increases with voltage class, for instance, ranging from 5 mm (for 69 kV cables) to 27 mm (for 400 kV cables).

Three different triple extrusion processes are used to manufacture the medium- to extra high-voltage cable cores: vertical continuous vulcanization (VCV), catenary continuous vulcanization (CCV) and Mitsubishi Dainichi continuous vulcanization (MDCV). In the CCV and MDCV processes, the thicker the insulation (or as the ratio of the insulation thickness to conductor size increases), the more sensitive the polymer melt is to gravity, which can lead to a loss of insulation concentricity. For this reason, most high voltage and extra high voltage cables are made using the VCV process (where molten polymer deformation due to gravity does not occur). In the CCV and MDCV processes that are used to manufacture some medium- to extra high-voltage cables, a critical requirement is for the insulation compounds to exhibit sufficiently high melt extensional (or zero shear) viscosities for "sag-resistance", so as to minimize eccentricity.

WO 2013/078018 and WO 2013/078224 teach processes for making branch modified, high melt strength ethylene-based polymers in a tubular reactor. WO 2006/094723 teaches that di- or higher functional (meth)acrylates, preferably 1,4-butanediol dimethacrylate, can be used as a branching agent for ethylene-based polymers made in a tubular reactor. WO 2012/057975 and WO 2012/084787 teach that various monomeric chain transfer agents can also be used as a branching agent for ethylene-based polymers, and WO 2014/003837 teaches asymmetrical polyenes for this use (PPG AEMA is an asymmetrical polyene).

SUMMARY OF THE INVENTION

In one embodiment, the invention is a poly(propylene glycol) allyl ether methacrylate (PPG AEMA) modified, high melt strength ethylene-based polymer, particularly LDPE, made in a tubular reactor.

In one embodiment, the invention is a high melt strength ethylene-based polymer, particularly LDPE, made in a tubular reactor and in the absence of a branching agent as described in WO 2013/078018, WO 2013/078224 or WO 2014/081458 (i.e., high melt strength ethylene homopolymer).

In one embodiment, the invention is a high melt strength ethylene-based polymer, particularly LDPE, made in a tubular reactor and modified with a di- or higher functional (meth)acrylate, particularly 1,4-butanediol dimethacrylate, branching agent.

In one embodiment, the invention is a high melt strength ethylene-based polymer, particularly LDPE, made in a tubular reactor and modified with a monomeric chain transfer agent.

In one embodiment, the invention is a high melt strength ethylene-based polymer, particularly LDPE, made in a tubular reactor and modified with an asymmetrical polyene.

In one embodiment, the invention is a composition comprising a peroxide-crosslinked, high melt strength ethylene-based polymer, particularly LDPE, made in a tubular reactor wherein the ethylene-based polymer satisfies the following equation at 190° C.:

$$\text{Melt Strength} = Ce^{-0.3(\text{melt index with } 2.16 \text{ kg load})}$$

where the parameter $C$ is greater than or equal to ($\geq$) 15, preferably $\geq 16$, more preferably $\geq 17$, and most preferably $\geq 18$. For compositions comprising conventional tubular LDPE (comparative examples), $C$ is $<15$ in the above equation. The data plotted in FIG. 1 are representative of the above equation for $C<15$ ("Conventional Tubular LDPE") and $C \geq 15$ ("PPG AEMA Modified Tubular LDPE") at 190° C. for LDPE.

In one embodiment, the invention is a composition comprising a peroxide-crosslinked, high melt strength ethylene-based polymer, particularly LDPE, made in a tubular reactor wherein the ethylene-based polymer satisfies the relationships at 190° C. shown in FIG. 2, where $V_{100}$ (also shown as V100 elsewhere) is the viscosity at shear rate of 100 rad $s^{-1}$.

In one embodiment, the invention is a composition comprising a peroxide-crosslinked, high melt strength ethylene-based polymer, particularly LDPE, that was made in a tubular reactor and has a dissipation factor (DF) measured at 130° C. (60 Hz, 2 kV) of less than or equal to (≤) 1.0%, or ≤0.7%, or ≤0.5%, or ≤0.3%, or ≤0.2%, or ≤0.1%. In one embodiment, the invention is a composition comprising a peroxide-crosslinked, high melt strength ethylene-based polymer, particularly LDPE, that was made in a tubular reactor and has a dissipation factor (DF) measured at 120° C. (60 Hz, 8 kV) of less than or equal to (≤) 1.0%, or ≤0.7%, or ≤0.5%, or ≤0.3%, or ≤0.2%, or ≤0.1%. In one embodiment, the invention is a composition comprising a peroxide-crosslinked, high melt strength ethylene-based polymer, particularly LDPE, that was made in a tubular reactor and has a dissipation factor (DF) measured at 100° C. (60 Hz, 8 kV) of less than or equal to (≤) 1.0%, or ≤0.7%, or ≤0.5%, or ≤0.3%, or ≤0.2%, or ≤0.1%.

In one embodiment the invention is a composition having a DF measured at 130° C. (60 Hz, 2 kV) or 120° C. (60 Hz, 8 kV) or 100° C. (60 Hz, 8 kV) of ≤0.5% and comprising a peroxide-crosslinked, high melt strength ethylene-based polymer made in a tubular reactor and modified with PPG AEMA.

In one embodiment the invention is a composition having a DF measured at 130° C. (60 Hz, 2 kV) or 120° C. (60 Hz, 8 kV) or 100° C. (60 Hz, 8 kV) of ≤0.5% and comprising a peroxide-crosslinked, high melt strength ethylene-based polymer made in a tubular reactor and modified with a di- or higher functional (meth)acrylate, e.g., 1,4-butane-diol dimethacrylate.

In one embodiment the invention is a composition having a DF measured at 130° C. (60 Hz, 2 kV) or 120° C. (60 Hz, 8 kV) or 100° C. (60 Hz, 8 kV) of ≤0.5% and comprising a peroxide-crosslinked, high melt strength ethylene-based polymer made in a tubular reactor and modified with a monomeric chain transfer agent.

In one embodiment the invention is a composition having a DF measured at 130° C. (60 Hz, 2 kV) or 120° C. (60 Hz, 8 kV) or 100° C. (60 Hz, 8 kV) of ≤0.5% and comprising a peroxide-crosslinked, high melt strength ethylene-based polymer made in a tubular reactor and modified with an asymmetrical polyene.

In one embodiment the invention is a composition having a DF measured at 130° C. (60 Hz, 2 kV) or 120° C. (60 Hz, 8 kV) or 100° C. (60 Hz, 8 kV) of ≤0.5% and comprising a peroxide-crosslinked, high melt strength ethylene homopolymer made by a process using (A) a tubular reactor comprising i (i≥3) reaction zones in which (1) the peak temperature of the first reaction zone is greater than the peak temperature in the $i^{th}$ reaction zone, and (2) the pressure in each reactor zone is less than or equal to (≤) 300 megaPascal (MPa), or ≤280 MPa, or ≤260 MPa, or ≤240 MPa, or ≤220 MPa, and (B) a chain transfer agent (CTA) that has a chain transfer constant (Cs) less than or equal to (≤) 0.50, or (≤) 0.35, or (≤) 0.20, or (≤) 0.15, or (≤) 0.017, or ≤0.015, or ≤0.013, or ≤0.011, or ≤0.010. The Cs is calculated as described by Mortimer at 130° C. and 1360 atmospheres (Ref. No. 1-3). The R value is ≥1, or ≥2, or ≥3 (the R value is calculated as described in WO/2013/078018). The process by which the ethylene homopolymer (ethylene-based polymer) is made is more fully described in WO 2013/078018 and WO 2013/078224 both of which are incorporated by reference in their entirety.

In one embodiment the invention is a process of making an insulated wire or cable, the process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene-based polymer made in a tubular reactor and modified with PPG AEMA, and
  (2) a peroxide, and
(B) crosslinking the PPG AEMA modified, high melt strength ethylene-based polymer.

In one embodiment the invention is a process of making an insulated wire or cable, the process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene-based polymer made in a tubular reactor and modified with a di- or higher functional (meth)acrylate, e.g., 1,4-butane-diol dimethacrylate and
  (2) a peroxide, and
(B) crosslinking the di- or higher functional (meth)acrylate modified, high melt strength ethylene-based polymer.

In one embodiment the invention is a process of making an insulated wire or cable, the process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene-based polymer made in a tubular reactor and modified with a monomeric chain transfer agent, and
  (2) a peroxide, and
(B) crosslinking the monomeric chain transfer agent modified, high melt strength ethylene-based polymer.

In one embodiment the invention is a process of making an insulated wire or cable, the process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene-based polymer made in a tubular reactor and modified with an asymmetrical polyene, and
  (2) a peroxide, and
(B) crosslinking the asymmetrical polyene modified, high melt strength ethylene-based polymer.

In one embodiment the invention is a process of making an insulated wire or cable, the process comprising the steps of:
(A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
  (1) a high melt strength ethylene homopolymer made by a process using (A) a tubular reactor comprising i (i≥3) reaction zones in which (1) the peak temperature of the first reaction zone is greater than the peak temperature in the $i^{th}$ reaction zone, and (2) the pressure in each reactor zone is less than or equal to (≤) 300 MPa, or ≤280 MPa, or ≤260 MPa, or ≤240 MPa, or ≤220 MPa, and (B) a chain transfer agent (CTA) that has a chain transfer constant (Cs) less than or equal to (≤) 0.50, or ≤0.35, or ≤0.20, or ≤0.15, or ≤0.017, or ≤0.015, or ≤0.013, or ≤0.011, or ≤0.010, and (2) a peroxide, and (B) crosslinking the branch modified high melt strength ethylene-based polymer made in a tubular reactor with the process of WO 2013/078018 and WO 2013/078224.

In one embodiment the invention is a process of making an insulated, low or medium voltage wire or cable, the process comprising the step of extruding onto a covered or uncovered metal conductor or optical fiber a composition having a DF, measured at 130° C. (60 Hz, 2 kV), of ≤0.5% and comprising (1) a high melt strength ethylene-based polymer made in a tubular reactor, and (2) a peroxide.

In one embodiment the invention is a process of making an insulated, high voltage wire or cable, the process comprising the step of extruding onto a covered or uncovered metal conductor or optical fiber a composition having a DF, measured at 100° C. (60 Hz, 8 kV), of ≤0.5% and comprising (1) a high melt strength ethylene-based polymer made in a tubular reactor, and (2) a peroxide.

In one embodiment the invention is a process of making an insulated, extra-high voltage wire or cable, the process comprising the step of extruding onto a covered or uncovered metal conductor or optical fiber a composition having a DF, measured at 120° C. (60 Hz, 8 kV), of ≤0.5% and comprising (1) a high melt strength ethylene-based polymer made in a tubular reactor, and (2) a peroxide.

In one embodiment the invention is a low-, medium, high or extra-high voltage wire or cable made by the inventive process.

DETAILED DESCRIPTION OF THE PREFERRED EMBODIMENT

Definitions

Figure 1:
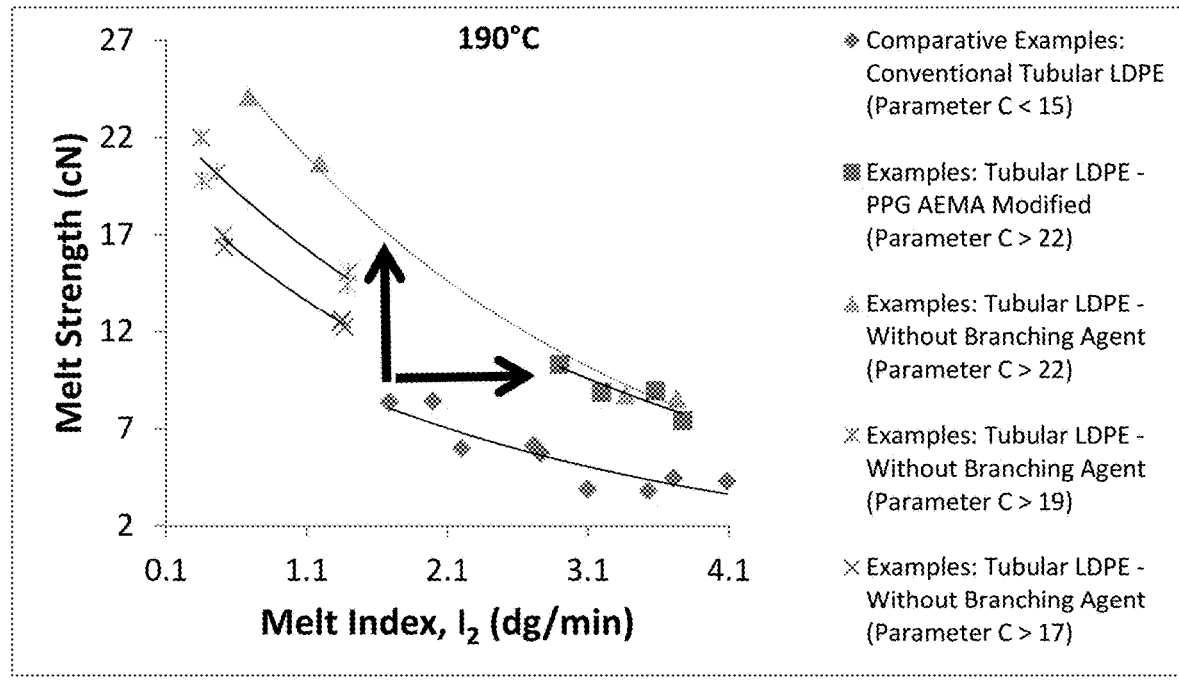
FIG. 1 is a plot reporting the relationship between melt strength (cN) and melt index (dg/min) for conventional tubular LDPE, PPG AEMA modified tubular LDPE and examples without branching agent at a temperature of 190° C.
Figure 2:
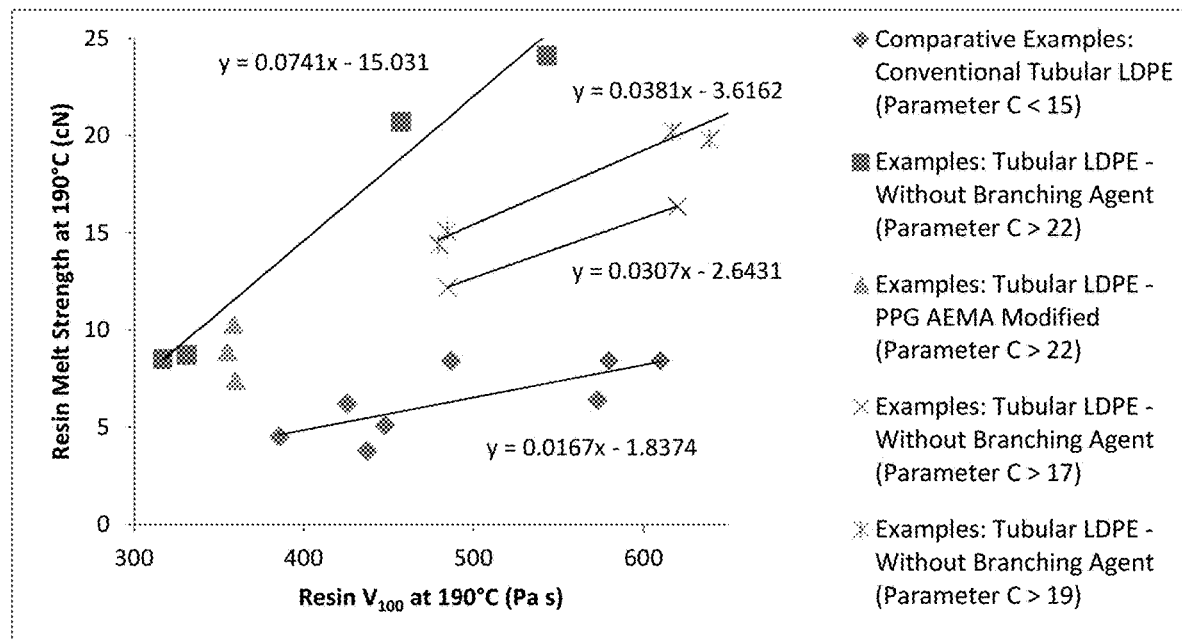
FIG. 2 is a plot reporting the relationship between melt strength (cN) and viscosity at shear rate of 100 rad s' for conventional tubular LDPE, PPG AEMA modified tubular LDPE and examples without branching agent at a temperature of 190° C.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the wire and cable sheathing made from these compositions are defined.

"Wire" and like terms mean a single strand of conductive metal, e.g., copper or aluminum, or a single strand of optical fiber.

"Cable", "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Electrical insulation applications are generally divided into low voltage insulation which are those less than 1 kV (one thousand volts), medium voltage insulation which ranges from 1 kV to 30 kV, high voltage insulation which ranges from 30 kV to 150 kV, and extra high voltage insulation which is for applications above 150 kV (as defined by the IEC, the International Electrotechnical Commission). Typical cable designs are illustrated in U.S. Pat. Nos. 5,246,783; 6,496,629 and 6,714,707.

"Uncovered wire", "uncovered cable" and like terms mean a metal conductor or optical fiber that is without a sheath, polymeric or otherwise. Typical sheaths include, but are not limited to, insulation coverings, semiconductor shields, protective jackets, metallic tape, and the like.

"Covered wire", "covered cable" and like terms mean a metal conductor or optical fiber that is encased in one or more sheaths, polymeric or otherwise.

"Composition" and like terms mean a mixture or blend of two or more components.

"Polymer" and like terms means a macromolecular compound prepared by reacting (i.e., polymerizing) monomers of the same or different type. "Polymer" includes homopolymers and interpolymers.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc. "Interpolymer" includes all forms of interpolymers, e.g., random, block, etc.

"Ethylene-based polymer", "ethylene polymer", "ethylene-based interpolymer" and like terms refer to a polymer that comprises a majority amount of polymerized ethylene based on the weight of the polymer and, optionally, may comprise at least one comonomer. "Ethylene-based polymer" include polymers that comprise a majority amount of polymerized ethylene based on the weight of the polymer modified with one or more branching agents such as PPG-AEMA, a di- or higher functional (meth)acrylate, a monomeric CTA, an asymmetrical polyene, and the like.

"High melt strength ethylene-based polymer" and like terms mean an ethylene-based polymer, particularly LDPE, modified or not with a branching agent, having a melt strength that satisfies the following equation at a test temperature of 190° C.:

$$\text{Melt Strength} = Ce^{-0.3(\text{melt index with 2.16 kg load})}$$

where parameter C is greater than or equal to ($\geq$) 15, preferably $\geq$16, more preferably $\geq$17, and most preferably $\geq$18.

"Ethylene-based polymer made in a tubular reactor", "high melt strength ethylene-based polymer made in a tubular reactor" and like terms mean an ethylene-based polymer, such as an LDPE resin, made by a process employing at least one tubular reactor.

"Peroxide-crosslinked, high melt strength ethylene-based polymer made in a tubular reactor" and like terms mean a high melt strength ethylene-based polymer that was made in a tubular reactor and was thereafter (subsequently) crosslinked through the action of a peroxide free radical initiator.

"Crosslinkable", "curable" and like terms means that the polymer, before or after extrusion, is not cured or crosslinked and has not been subjected or exposed to treatment that has induced substantial crosslinking although the polymer comprises additive(s) or functionality which will cause or promote substantial crosslinking upon subjection or exposure to such treatment (e.g., peroxide).

"Crosslinked", "cured" and similar terms mean that the polymer, before or after it is extruded onto a wire or cable, was subjected or exposed to a treatment which induced crosslinking and has gel content as measured by extraction in boiling xylene or decahydronaphthalene (decalin) of greater than or equal to 10 weight percent.

"Room temperature" and like terms mean 23° C.

Ethylene Based Polymer

In one embodiment, the ethylene-based polymer is a low density polyethylene (LDPE) made in a tubular reactor.

In one embodiment, the ethylene-based polymer has a melt index ($I_2$) from 0.1 to 100 grams per 10 minutes (g/10 min). In one embodiment, the ethylene-based polymer has an I2 from 0.3 to 100 g/10 min, or from 0.5 to 30 g/10 min, or from 1.0 to 10 g/10 min, or from 1.0 to 5.0 g/10 min. In one embodiment, the ethylene-based polymer has an I2 from 0.3 to 100 g/10 min, or from 1 to 50 g/10 min, or from 2 to 20 g/10 min.

In one embodiment, the ethylene-based polymer has a weight average molecular weight (Mw(abs)) versus I2 relationship meeting the following: Mw(abs)<A+B($I_2$), wherein A=2.40×10$^5$ g/mole and B=-8.00×10$^3$ (g/mole)/(dg/min).

In one embodiment the ethylene-based polymer has a density greater than or equal to 0.910, or greater than or equal to 0.914, or greater than or equal to 0.916 grams per cubic centimeter (g/cc or g/cm$^3$).

In one embodiment the ethylene-based polymer has a density less than or equal to 0.940, or less than or equal to 0.935, or less than or equal to 0.932, grams per cubic centimeter (g/cc or g/cm$^3$).

In one embodiment the ethylene-based polymer has a density from 0.910 to 0.940. In one embodiment, the ethylene-based polymer has a density from 0.910 to 0.940, or from 0.915 to 0.935, or from 0.916 to 0.932 g/cc.

Preferably, in one embodiment the ethylene-based polymer has a density from 0.912 to 0.940, or from 0.915 to 0.935, or from 0.920 to 0.930, or from 0.918 to 0.926 g/cc.

In one embodiment, the ethylene-based polymer has a density of from 0.916 to 0.940, or from 0.916 to 0.921, or from 0.920 to 0.924, or from 0.923 to 0.940.

In one embodiment, the ethylene-based polymer has a density from 0.920 to 0.940 g/cc.

In one embodiment, the ethylene-based polymer has a G' value meeting the following relationship:

$$G' \geq C + D \log(I_2)$$

wherein the following parameters have been used: C=162 Pa and D=−90 Pa/log(dg/min).

In one embodiment, the ethylene-based polymer has a melt strength (MS) and melt index ($I_2$) having the following relationship at a temperature of 190° C.:

$$\text{Melt Strength} = Ce^{-0.3(\text{melt index with 2.16 kg load})}$$

where parameter C is greater than or equal to ($\geq$) 15, preferably $\geq$16, more preferably $\geq$17, and most preferably $\geq$18.

In one embodiment, the ethylene-based polymer has an n-hexane extractables content of less than or equal to 5.0 wt %, or of less than or equal to 4.0 wt %, or less than or equal to 3.0 wt %, or less than or equal to 2.6 wt %, or less than 2.6 wt % based on the total weight of the polymer.

In one embodiment, the ethylene-based polymer has an n-hexane extractables content of less than 4 wt %, wherein the n-hexane extractable content is in weight percent based on the total weight of the polymer.

In one embodiment, the ethylene-based polymer has a density between 0.916 and 0.921 g/cc and an n-hexane extractable content less than 4.0 wt %, preferably less than 3.0 wt %, and more preferably less than 2.6 wt %.

In one embodiment, the ethylene-based polymer has a density between 0.920 and 0.924 g/cc and an n-hexane extractable content less than 4.0 wt %, preferably less than 3.0 wt %, and more preferably less than 2.6 wt %.

In one embodiment, the ethylene-based polymer has a density between 0.923 and 0.940 g/cc and an n-hexane extractable content less than 4.0 wt %, or preferably less than 3.0 wt %, or more preferably less than 2.6 wt %.

In one embodiment, the LDPE has terminal vinyls per 1000 carbon atoms from 0.01 to 1.0, preferably from 0.03 to 0.8, more preferably from 0.05 to 0.7, and even more preferably from 0.1 to 0.6.

In one embodiment, the ethylene-based polymer is a high melt strength ethylene-based polymer made in a tubular reactor and has a measured dissipation factor at 130° C. (60 Hz, 2 kV), after peroxide crosslinking, of less than or equal to ($\leq$) 0.5%. In one embodiment, the ethylene-based polymer is a high melt strength ethylene-based polymer made in a tubular reactor and has a measured dissipation factor at 120° C. (60 Hz, 8 kV), after peroxide crosslinking, of less than or equal to ($\leq$) 3.0%. In one embodiment, the ethylene-based polymer is a high melt strength ethylene-based polymer made in a tubular reactor and has a measured dissipation factor at 100° C. (60 Hz, 8 kV), after peroxide crosslinking, of less than or equal to (≤) 1.5%. The dissipation factor may vary with the presence or absence of other components. The dissipation factor may also vary depending on the test conditions, including temperature and applied voltage. In one embodiment, the dissipation factor may be greater for a base composition comprising only the ethylene-based polymer and peroxide (after crosslinking) than for a fully formulated composition comprising the base composition plus other additives, e.g., antioxidants, UV inhibitors, etc. Examples 4-6 reported in Table 3 below exemplify a base composition of a high melt strength ethylene-based polymer made in a tubular reactor and crosslinked with peroxide, while Examples 7-15E reported in Tables 4 and 5 below exemplify fully formulated compositions. Another example of a fully formulated composition is a composition comprising a high melt strength ethylene-based polymer made in a tubular reactor in combination with a peroxide and one or more additives such that the composition is ready for extrusion as an insulation sheath for a low-, medium, high or extra-high voltage wire or cable.

In one embodiment, the ethylene-based polymer is a high melt strength ethylene-based polymer made in a tubular reactor, and satisfies Equation (1) below in which parameter C is greater than or equal to (≥) 15, preferably ≥16, more preferably ≥17, and most preferably ≥18:

$$\text{Melt strength} = Ce^{-0.3(\text{melt index with 2.16 kg load})} \quad \text{(Eq. 1)}$$

Equation 1 describes the variation of melt strength at 190° C. (cN) of ethylene-based polymer with that of melt index at 190° C. (dg/min). In the case of conventional tubular ethylene-based polymer, particularly LDPE (see the comparative examples), parameter C is <15 in above Equation (1). The data plotted in FIG. 1 are representative of above Equation (1) for parameter C<15 (conventional tubular LDPE) and parameter C≥15 ("PPG AEMA Modified Tubular LDPE").

The high melt strength ethylene-based polymers made in a tubular reactor used in the practice of this invention exhibit a better balance of melt strength versus melt index than conventional ethylene polymers, particularly tubular LDPE, due to enhanced long chain branching. Discharge melt temperatures during extrusion are also reduced significantly at given screw speeds, which in turn yield a decreased propensity for peroxide decomposition (crosslinking) during extrusion. Furthermore, the dissipation factor at 130° C. (60 Hz, 2 kV) or 120° C. (60 Hz, 8 kV) or 100° C. (60 Hz, 8 kV) after peroxide crosslinking is sufficiently low. In an embodiment, the high melt strength ethylene-based polymers of this invention are free (or contain inconsequential amounts) of components, additives or contaminants that can have deleterious effects on dissipation factor and other electrical properties.

Branching Agent

As used in this disclosure, "branching agent" and like terms mean a compound that can attach to and form a branch of a high melt strength ethylene-based polymer.

In one embodiment, the branching agent is a poly(propylene glycol) allyl ether methacrylate (PPG AEMA) of following formula (i):

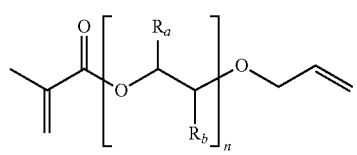

wherein n is from 1 to 50, further from 1 to 20 and further from 1 to 10; $R_a$ is selected from H or an alkyl (preferably ethyl or methyl and more preferably methyl); $R_b$ is selected from H or an alkyl (preferably ethyl or methyl and more preferably methyl); and preferably wherein $R_a$ and $R_b$ are selected from the group consisting of (a) $R_a$ and $R_b$ are both H, (b) when $R_a$ is methyl, then $R_b$ is H, and (c) when $R_a$ is H, then $R_b$ is methyl.

In one embodiment, the branching agent is of the following formula (ii)

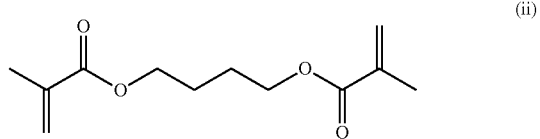

In one embodiment, the PPG AEMA branching agent has $^1$H NMR signals from 3.0 to 6.5 ppm chemical shift.

In one embodiment, the LDPE polymer is polymerized in the presence of at least two branching agents as disclosed herein.

The branching agents may comprise a combination of two or more embodiments as described herein.

In one embodiment, the branching agent is incorporated into the ethylene-based polymer at the α,β-unsaturated-carbonyl end.

In one embodiment, the branching agent is incorporated into the ethylene-based polymer at the C—C double bond end.

In one embodiment, the branching agent is incorporated into the ethylene-based polymer at both the α,β-unsaturated-carbonyl end and the C—C double bond end.

In one embodiment, the branching agent is a di- or higher functional (meth)acrylate, preferably 1,4-butanediol dimethacrylate, as disclosed in WO 2006094723.

In one embodiment, the branching agent is a monomeric chain transfer agent as disclosed in WO 2012/057975 or WO 2012/084787. These chain transfer agents are monomers that incorporate into the backbone on an α,β-unsaturated-carbonyl end of the molecule and chain transfer from another functional group on the molecule.

In one embodiment, the branching agent is an asymmetrical polyene as disclosed in WO 2014/003837. Asymmetrical polyenes comprise an α,β-unsaturated-carbonyl end and a C—C double bond end. PPG AEMA is a member of this class of asymmetrical polyenes.

Processes for Making High Melt Strength Ethylene-Based Polymers Modified with a Branching Agent For producing a highly branched ethylene-based polymer, a high pressure, free-radical initiated polymerization process is typically used. Two different high pressure free-radical initiated polymerization reactor types are known. In one type, an agitated autoclave vessel having one or more reaction zones is used. The autoclave reactor normally has several injection points for initiator and/or monomer feeds. In the other type, a jacketed tube having one or more reaction zones is used as a reactor. Suitable, but not limiting, reactor lengths may be from 100 to 3600 meters (m), or from 1000 to 2800 m. The beginning of a reaction zone, for either type of reactor, is typically defined by the site injection of initiator of the reaction, ethylene, chain transfer agent (CTA, also known as a telomer), comonomer(s), and any combination thereof.

The high melt strength ethylene-based polymers used in the practice of this invention are made in a reactor configuration comprising at least one tubular reactor. As used in this disclosure, "reactor configuration" means the type and number of reactors used in the process to make high pressure ethylene-based polymers. A tubular reactor can have one or more reaction zones, and a reactor configuration can comprise one or more tubular reactors, each with one or more reaction zones. A reactor configuration can comprise at least one tubular reactor and at least one autoclave reactor, and each autoclave reactor can have one or more reaction zones.

In one embodiment, the high melt strength ethylene-based polymer is made in a reactor configuration that does not comprise an autoclave reactor, i.e., the reactor configuration comprises only one or more tubular reactors.

In one embodiment, the high melt strength ethylene-based polymer is made in a reactor configuration comprising a tubular reactor and an autoclave reactor. In one embodiment, the tubular reactor is downstream from the autoclave reactor.

Often a chain transfer agent (CTA) is used to control molecular weight. In one embodiment, one or more CTAs are added to the polymerization process. CTAs typically comprise at least one of the following groups: alkanes, aldehydes, ketones, alcohol, ether, esters, mercaptan or phosphine. In a further embodiment, a CTA comprises at least one group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. Exemplary CTAs include, but are not limited to, propylene, isobutane, n-butane, 1-butene, methyl ethyl ketone, acetone, ethyl acetate, propionaldehyde, ISOPAR™-C, -E, and -H (ExxonMobil Chemical Co.), and isopropanol. In one embodiment, the amount of CTA used is from 0.03 to 10 weight percent based on the weight of the total reaction mixture.

In one embodiment in which CTA is added to the polymerization, the ratio of the concentration of the CTA in the feed to reaction zone i, wherein i≥2 and reaction zone i is downstream from reaction zone 1, to the concentration of the CTA in the feed to reaction zone 1 is greater than or equal to than 1.0, or greater than 1.5, or greater than 2.

In one embodiment, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range and the conversion levels for autoclave reactors at the lower end of this range.

In one embodiment, the polymerization may take place in a tubular reactor as described in International Application No. PCT/US12/059469. This patent application uses a multi-zone reactor and describes alternate locations of feeding fresh ethylene to control the ethylene to CTA ratio and therefore polymer properties. Fresh ethylene may be simultaneously added in multiple locations to achieve the desired ethylene to CTA ratio. In a similar way, addition of fresh CTA at addition points may be carefully selected to control polymer properties as described in International Application No. PCT/US12/064284. Fresh CTA may be simultaneously added in multiple locations to achieve the desired CTA to ethylene ratio.

Likewise, the addition points and the amount of the fresh branching agent, e.g., PPG AEMA, as described in this application, may be controlled to control gel formation while maximizing the desired property of increased melt strength and performance in targeted applications. In one embodiment, fresh branching agent may be simultaneously added in multiple locations to achieve the desired branching agent to ethylene ratio. The use of branching and/or coupling agent to broaden MWD and increase the melt strength of the polymer will put further requirements on the distribution of the CTA and the branching agent along a reactor system in order to achieve the desired change in product properties without or minimizing potential negative impacts like gel formation, reactor fouling, process instabilities, low efficiency of the branching agent, etc.

In one embodiment, the polymerization takes place in at least one tubular reactor. In a multi-reactor system, the autoclave reactor usually precedes the tubular reactor. The addition points and amounts of fresh ethylene, fresh CTA, and fresh branching agent may be appropriately controlled to achieve the desired ratios of CTA to ethylene and branching agent to ethylene in the feeds to and/or in the reaction zones.

In one embodiment, the branching agent is as described herein and added to the polymerization in an amount from 0.002 to 0.300 mole percent (mol %), or from 0.005 to 0.300 mol %, based on the total moles of ethylene and branching agent added to the polymerization.

In one embodiment, the polymerization takes place in two reactors. In one embodiment, the polymerization takes place in one reactor with multiple or at least two reaction zones.

In one embodiment, the polymerization takes place in a reactor configuration comprising at least two reaction zones, reaction zone 1 and reaction zone i (i≥2) and wherein reaction zone i is downstream from reaction zone 1. In an embodiment, i is from 2-6, or from 2-5, or from 2-4. In an embodiment, i=2.

In one embodiment, the total number of reaction zones=n. In a further embodiment, n is from 1 to 20, further from 1 to 10, and further from 1 to 6.

In a further embodiment, n is from 2 to 20, further from 2 to 10, and further from 2 to 6.

In one embodiment, more branching agent, by mass, is added to reaction zone i as compared to the amount of branching agent, by mass, added to reaction zone 1. In one embodiment, more branching agent, by mass, is added to reaction zone 1 as compared to the amount of branching agent added to reaction zone i. As used above, the amount of branching agent is determined based on the branching agent added to a reaction zone in a fresh feed (i.e., not carry-over branching agent).

In one embodiment, a greater concentration of branching agent is added to reaction zone i as compared to the concentration of branching agent added to reaction zone 1. In one embodiment, a greater concentration of branching agent is added to reaction zone 1 as compared to the concentration of branching agent added to reaction zone i.

In one embodiment, branching agent is added to both reaction zone 1 and reaction zone i.

In one embodiment, no branching agent is added to reaction zone 1.

Depending on the reactivity ratios of the branching agent and distribution of branching agent between reaction zones, the amount of branching agent incorporated into the ethylene-based polymer in each reaction zone, and which end of the branching agent (i.e., α,β-unsaturated-carbonyl end" or C—C double bond end) incorporates into the ethylene-based polymer, may vary.

In one embodiment, the ratio of the concentration of the branching agent incorporated into the locally-formed polymer of reaction zone 1 to the concentration of branching agent incorporated into the locally-formed polymer of reaction zone i (i≥2, or from 2 to 5, or from 2 to 4, or equal to 2) is less than or equal to 1, or less than 1, or less than or equal to 0.75, or less than or equal to 0.5.

In one embodiment, the ratio of the concentration of the branching agent incorporated into the locally-formed polymer of reaction zone 1 to the concentration of branching agent incorporated into the locally-formed polymer of reaction zone 2 (i=2) is less than or equal to 1, or less than 1, or less than or equal to 0.75, or less than or equal to 0.5. In a further embodiment, a majority amount of branching agent incorporated into the ethylene-based polymer is incorporated through the α,β-unsaturated-carbonyl end.

In one embodiment, the ratio of the concentration of the branching agent incorporated into the locally-formed polymer of reaction zone 1 to the concentration of branching agent incorporated into the locally-formed polymer of reaction zone i+1 is less than 1, or less than 1, or less than or equal to 0.75, or less than or equal to 0.5.

In one embodiment, the ratio of the concentration of the branching agent incorporated into the locally-formed polymer of reaction zone 1 to the concentration of branching agent incorporated into the locally-formed polymer of reaction zone i (i=2 to n−1, wherein n is the total number of reaction zones) is less than or equal to 1, or less than 1, or less than or equal to 0.75, or less than or equal to 0.5, and the ratio of the concentration of the branching agent incorporated into the locally-formed polymer of reaction zone 1 to the concentration of branching agent incorporated into the locally-formed polymer of reaction zone i+1 is less than 1, or less than 1, or less than or equal to 0.75, or less than or equal to 0.5. In a further embodiment, a majority amount of branching agent incorporated into the ethylene-based polymer is incorporated through the α,β-unsaturated-carbonyl end.

In one embodiment, the ratio of the concentration of the branching agent incorporated into the locally-formed polymer of reaction zone i+1 (i is from 2 to n−1 and n is the total number of reaction zones) to the concentration of the branching agent incorporated into the locally-formed polymer of reaction zone 2 is less than or equal to 1, or less than 1, or less than or equal to 0.7, or less than or equal to 0.5. In a further embodiment, a majority amount of incorporated into the ethylene-based polymer is incorporated through the α,β-unsaturated-carbonyl end.

In an embodiment, the concentration of branching agent in the total ethylene feed to the reactor is less than 0.2 mole percent, or less than 0.1 mole percent, or less than 0.05 mole percent, or less than 0.025 mole percent based on the total moles of ethylene fed to the reactor.

In one embodiment, the ethylene fed to the first reaction zone is at least 10 percent of the total ethylene fed to the polymerization. In one embodiment, the ethylene fed to the first reaction zone is 10 to 100 percent, or 20 to 80 percent, or 25 to 75 percent, or 30 to 70 percent, or 40 to 60 percent of the total ethylene fed to the polymerization.

In one embodiment, the ethylene-based polymer comprises ethylene and one or more comonomers, and preferably one comonomer. Comonomers include, but are not limited to, di- or higher functional (meth)acrylates, monomeric chain transfer agents, acetates, alkoxy silane, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

In one embodiment, the ethylene-based polymer comprises ethylene and at least one asymmetrical branching agent as the only monomeric units.

Free radical initiators are generally used to produce the inventive ethylene-based polymers. A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers.

In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX™ 301 (3,6,9-triethyl-3,6,9-trimethyl-1,4,7-triperoxonaan) and TRIGONOX™ 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

A process for forming an ethylene-based polymer may comprise a combination of two or more embodiments as described herein.

Composition Comprising PPG AEMA or Other Branch Modified High Melt Strength Ethylene-Based Polymer The invention also provides a composition comprising a high melt strength, PPG AEMA or other branch modified ethylene-based polymer as described herein.

In one embodiment, the composition further comprises an ethylene/α-olefin interpolymer with a density less than or equal to 0.954 g/cc.

In one embodiment, the composition further comprises another ethylene-based polymer that differs from the inventive ethylene-based polymer in one or more properties, for example, density, I2, weight average molecular weight (Mw(abs)), number average molecular weight (Mn(conv)), or polydispersity index (Mw(abs)/(Mn(conv)).

The invention also provides an article comprising at least one component formed from the inventive composition.

In one embodiment, the article is a coating for a cable or wire. In one embodiment, the cable or wire is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration.

An inventive ethylene-based polymer may comprise a combination of two or more embodiments as described herein.

An inventive composition may comprise a combination of two or more embodiments as described herein.

An inventive article may comprise a combination of two or more embodiments as described herein.

Additives

An inventive composition may comprise one or more additives. Additives include, but are not limited to, cross-linking agents, coagents, cure boosters, coupling agents, antioxidants, ultraviolet absorbers, stabilizers, plasticizers, lubricants, antistatic agents, conductive agents, pigments, dyes, nucleating agents, fillers, slip agents, fire retardants, flame retardants, processing aids, smoke inhibitors, viscosity control agents, tackifiers, anti-blocking agents, surfactants, extender oils, acid scavengers, tree-retardants (e.g., polyethylene glycol, polar polyolefin copolymers, etc.), scorch retardants, and metal deactivators. Fillers include (but are not limited to) calcined clay, organo-clay and carbon black. Additives can be used in amounts ranging from less than 0.01 to more than 10 wt % based on the weight of the composition. Typically, the total amount of additives in the composition is between 0.1 and 10 wt % based on the weight of the composition.

In one embodiment the polymers of this invention are treated with one or more stabilizers or antioxidants, such as IRGANOX 1010, IRGANOX 1076 and IRGAFOS™ 168. Optionally, the polymers are treated with one or more stabilizers or antioxidants before extrusion or other melt processes. In an embodiment, the compositions of this invention are free (or contain inconsequential amounts) of components, additives or contaminants that can have deleterious effects on dissipation factor and other electrical properties.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modified polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. Nos. 6,545,088; 6,538,070; 6,566,446; 5,844,045; 5,869,575; and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY™ Plastomers and ENGAGE™ Elastomers (The Dow Chemical Company) and EXACT™ (ExxonMobil Chemical Co.)). Propylene-based copolymers (for example, polymers available under the trade designation VERSIFY™ Plastomers & Elastomers (The Dow Chemical Company) and VISTAMAXX™ (ExxonMobil Chemical Co.) can also be useful as components in blends comprising an inventive polymer.

Crosslinking of the Compositions

Any peroxide that will promote the crosslinking of the composition of this invention can be used in the practice of this invention, including an organic peroxide. Exemplary peroxides include dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)2,5-dimethylhexane-3; 1,1-bis(t-butylperoxy)3,3, 5-trimethylcyclohexane; isopropylcumyl cumylperoxide; di(isopropylcumyl) peroxide; or mixtures thereof. Peroxide curing agents are used in amounts of at least 0.5 wt % based on the weight of the composition. In various embodiments the peroxide curing agent is used in an amount of 0.5-10, or 0.7-5 or 1-3 wt % based on the weight of the composition. The peroxides can be used alone or in combination with various other known curing co-agents, boosters, and retarders, such as triallyl isocyanurate; ethoxylated bisphenol A dimethacrylate; α-methyl styrene dimer (AMSD); and other co-agents described in U.S. Pat. Nos. 5,346,961 and 4,018,852.

As an alternative, or in addition, to the use of peroxides for the crosslinking of the compositions of this invention, other approaches for crosslinking of polymers may be used to effect the desired degree of crosslinking. Such approaches and technologies are well known to those skilled in the art and include (but are not limited to) radiation crosslinking, moisture crosslinking, bisulfonyl azide crosslinking, crosslinking with hydroxyl terminated PDMS, etc. In some cases, it would be necessary for the polymers used in the practice of this invention to be functionalized appropriately to enable crosslinking (for example, with alkoxy silanes in the case of moisture crosslinking or crosslinking with hydroxyl terminated PDMS).

Properties of the Compositions

The properties of the compositions of this invention, in one embodiment as a base composition (consisting of a high melt strength ethylene-based polymer made in a tubular reactor and peroxide), or in one embodiment as a fully formulated composition (the base composition plus one or more other components), or in one embodiment as both, are preferably as follows:

A measure of scorch-resistance at extrusion conditions: ts1 (time for 1 lb-in increase in torque) at 140° C.>10 min, preferably >15 min, most preferably >20 min (peroxide containing compositions).

A measure of crosslinkability in the continuous vulcanization step: MH (maximum torque at 182° C.)—ML (minimum torque at 182° C.)>0.2 lb-in, preferably >0.6 lb-in, most preferably >1.0 lb-in (peroxide containing compositions).

Gel content >30%, preferably >40%, more preferably >50% (after crosslinking).

Hot creep: any value (even if not measurable, due to not enough crosslinking for hot creep to be measurable), preferably <200%, more preferably <150% (after crosslinking).

Dissipation factor at 60 Hz and 2 kV (130° C.) or 8 kV (100° C. or 120° C.): ≤1.0%, or ≤0.7%, or ≤0.5%, or ≤0.4%, or ≤0.3%, or ≤0.2%, or ≤0.1%. (after crosslinking).

Furthermore, the branched modified, high melt strength ethylene-based polymer made in a tubular reactor of this invention can be used to make thermoplastic electrical (wire and cable) insulation/jacket where high melt strength is desirable (including, but not limited to, telecommunication cables and flame-retardant cables). The insulation/jacket may be solid or cellular (foamed).

Applications

The polymers, polymer blends and compositions of this invention may be employed in a variety of conventional thermoplastic fabrication processes to produce useful articles, including extrusion coatings onto various substrates; monolayer and multilayer films; molded articles, such as blow molded, injection molded, or rotomolded articles; coatings; foams; fibers; and woven or non-woven fabrics.

Suitable applications include, but are not limited to, wires and cables, gaskets and profiles, adhesives; footwear components, and auto interior parts. In one embodiment the polymers, polymer blends and/or compositions of this invention are used to make an insulation sheath for a low-, medium-, high- or extra-high voltage wore or cable; or a medium-, high- or extra-high voltage wore or cable; or a high- or extra-high voltage wore or cable.

Any known process may be used to make the wires and cables of this invention with the polymers, polymer blends and compositions of this invention. These include (but are not limited to) the following triple extrusion processes that are used to manufacture medium- to extra high-voltage cable cores: vertical continuous vulcanization (VCV), catenary continuous vulcanization (CCV) and Mitsubishi Dainichi continuous vulcanization (MDCV).

The components of the composition can be mixed or blended in any manner and using any equipment. The mixing or blending may be done at, below or above the upper melting temperature (point) of the polymer. The peroxide and other additives can be added in any manner, including soaking and mixing. In one embodiment, the additives are blended with one another and then added to the polymer. In one embodiment, the additives are added individually. The peroxide can be soaked or mixed with the polymer prior to melt processing or extrusion to make the cables. In an embodiment, all the ingredients (including peroxide) are melt-blended in one step. In another embodiment, all the ingredients (including peroxide) are melt-blended in one step as part of the cable extrusion process, without a need to first prepare a compound prior to use during cable extrusion. In an embodiment, the peroxide and/or other additives are premixed with the solid polymer very quickly in a "turbo-mixer" prior to being discharged into the extruder via a feed hopper.

Test Methods

Samples that are measured for density are prepared according to ASTM D 1928. Samples are pressed at 374° F. (190° C.), and 30,000 psi, for three minutes, and then at 70° F. (21° C.) and 30,000 psi (207 MPa) for one minute. Density measurements are made after 40 hours of sample pressing, using ASTM D792, Method B.

Melt index, or $I_2$, is measured in accordance with ASTM D 1238, Condition 190° C./2.16 kg, and is reported in grams eluted per 10 minutes. The $I_{10}$ is measured in accordance with ASTM D 1238, Condition 190° C./10 kg, and was reported in grams eluted per 10 minutes.

GPC Method: A Triple Detector Gel Permeation Chromatography (3D-GPC or TDGPC) system consisting of a PolymerChar (Valencia, Spain) high temperature chromatograph GPC-IR, equipped with a 2-angle laser light scattering (LS) detector Model 2040 from Precision Detectors, now Agilent Technologies (CA, USA), and a 4-capillary solution viscometer (DP) from PolymerChar is used. Data collection is performed using Polymer Char "GPC One" software. The system is also equipped with an online solvent degassing device from Agilent Technologies.

High temperature GPC columns consisting of four 30 cm, 20 um mixed A LS columns from Agilent Technologies are used. The GPC-IR autosampler oven is operated at 160° C., and the column compartment is operated at 150° C. The samples are prepared semi-automatically via dosing from the GPC-IR syringe at a concentration of 2 mg/ml with an including decane flow rate marker delivered via micropump. The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are shaken at 160° C. for three hours. The injection volume is 200 microliters. The flow rate through the GPC is set at 1.0 ml/minute.

Column calibration and sample molecular weight calculations are performed using Polymer Char "GPC One" software. Calibration of the GPC columns is performed with 21 narrow molecular weight distribution polystyrene standards obtained from Polymer Laboratories (now Agilent Technologies). The molecular weights of the polystyrene standards range from 580 to 8,400,000 g/mol and are arranged in 6 "cocktail" mixtures with at least a decade of separation between the individual molecular weights with individual concentrations ranging from 0.25 (Mp>500,000) to 0.5 mg/ml (Mp<500,000), dissolving for 24 hours in TCB at room temperature in a dark environment.

The peak molecular weights of polystyrene standards are converted to polyethylene molecular weights using the following equation (as described in Williams and Ward, J. Polym. Sci., Polym. Let., 6, 621 (1968)):

$$M_{polyethylene} = A(M_{polystyrene})^B$$

Here, B has a value of 1.0, and the experimentally determined value of A is 0.38 to 0.44.

The column calibration curve is obtained by fitting a first order polynomial to the respective polyethylene-equivalent calibration points obtained from the above Equation to the observed elution volumes.

The conventional number and weight-average molecular weights (Mn(conv) and Mw(conv), respectively) are calculated according to the following equations:

$$\overline{Mn} = \frac{\sum_i Wf_i}{\sum_i (Wf_i/M_i)} \quad \overline{Mw} = \frac{\sum_i (Wf_i * M_i)}{\sum_i Wf_i}$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn).

The A value is determined by adjusting the A value in the Williams and Ward Equation until Mw, the weight average molecular weight, calculated using the above Equation, and the corresponding retention volume polynomial agreed with the independently determined value of Mw, obtained in accordance with a linear polyethylene homopolymer reference with known absolute weight-average molecular weight of 115,000 g/mol as measured by LALLS in a manner traceable to standard homopolymer polyethylene NBS1475.

The absolute weight average molecular weight (Mw(abs)) are characterized by the baseline-subtracted LS(15 degree angle) and IR-5 (measurement signal) concentration detectors using the following equation:

$$|Mw(\text{abs}) = K_{LS} * \frac{\sum(LS_i)}{\sum(IR_i)}$$

wherein $\Sigma(LS_i)$ is the response area of the LS detector, $\Sigma(IR_i)$ is the response area of the IR-4 detector, and $K_{LS}$ is the instrument constant which was determined using a standard NIST 1475 with known concentration and certificated value for the weight average molecular weight of 52,000 g/mol.

The absolute molecular weight at each elution volume is calculated using the following equation:

$$M_{LS,i} = K_{LS} * \frac{LS_i}{IR_i}$$

wherein $K_{LS}$ is the determined instrument constant, $LS_i$ and $IR_i$ are the baseline-subtracted LS (15 degree) and IR5 (measurement) detector responses of the same i-th elution component.

The absolute number average and z average molecular weight are calculated with the following equations:

$$Mn(\text{abs}) = K_{LS}\frac{\sum(IR_i)}{\sum(IR_i)/\left(\frac{LS_i}{IR_i}\right)} \quad Mz(\text{abs}) = K_{LS}\frac{\sum IR_i * \left(\frac{LS_i}{IR_i}\right)^2}{\sum IR_i * \left(\frac{LS_i}{IR_i}\right)}$$

A linear extrapolation was performed on log $M_{LS,i}$-elution volume plot when the log $M_{LS,i}$ data scattered caused by low LS or IR detector responses.

Extrusion evaluation of the polymers is conducted on a 2.5 inch 24:1 L/D extruder using a Maddock screw and 20/40/60/20 mesh screens (at set temperatures of 115.6° C. across all five zones, head and the die). The screw speeds range from 25 rpm to 100 rpm. Discharge (melt) temperature is measured by a hand-held thermocouple and this parameter is a measure of the extent of shear-heating prevalent.

Standard Method for Hexane Extractables: Polymer pellets (from the polymerization pelletization process without further modification; approximately 2.2 grams per press) are pressed in a Carver Press at a thickness of 3.0-4.0 mils. The pellets are pressed at 190° C. for three minutes at 40,000 lb$_f$. Non-residue gloves (PIP* CleanTeam* CottonLisle Inspection Gloves, Part Number: 97-501) are worn so as to not contaminate the films with residual oils from the hands of the operator. Films are cut into 1-inch by 1-inch squares and weighed (2.5±0.05 g). The films are then extracted for two hours in a hexane vessel containing about 1000 ml of hexane at 49.5±0.5° C. in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP Vacuum Oven, Model 281A at approximately 30 inches Hg) for two hours. The films are then place in a desiccator and allowed to cool to room temperature for a minimum of one hour. The films are then reweighed and the amount of mass loss due to extraction in hexane is calculated. This method is based on 21 CRF 177.1520 (d)(3)(ii) with one deviation from FDA protocol by using hexanes instead of n-hexane.

Melt strength measurements are conducted at temperature of 190° C. on a Gottfert Rheotens 71.97 (Göettfert Inc.; Rock Hill, SC) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/sec$^2$. The tensile force is recorded as a function of the take-up speed of the nip rolls. Melt strength is reported as the plateau force in centiNewtons (cN) before the strand broke. The following conditions are used in the melt strength measurements: plunger speed=0.265 mm/sec; wheel acceleration=2.4 mm/sec$^2$; capillary diameter=2.0 mm; capillary length=30 mm; and barrel diameter=12 mm.

Unsaturation content of polyethylene (including terminal vinyls per 1000 carbon atoms) is determined by nuclear magnetic resonance (NMR), Fourier Transform Infrared Spectroscopy (for instance, as per the procedure described in U.S. Pat. No. 8,912,297 B2) or any other known method (or yet to be developed method).

Dynamic oscillatory shear measurements are conducted over a range of 0.1 rad s$^{-1}$ to 100 rad s$^{-1}$ at a temperature of 190° C. and 10% strain with stainless steel parallel plates of 25 mm diameter on the strain controlled rheometer ARES/ARES-G2 by TA Instruments, to determine the melt flow properties of the ethylene-based polymers. V0.1 and V100 are the viscosities at 0.1 and 100 rad s$^{-1}$, respectively (with V0.1/V100 being a measure of shear thinning characteristics).

Dynamic oscillatory shear measurements are conducted over a range of 0.1 rad s$^{-1}$ to 100 rad s$^{-1}$ using a TA Instruments Advanced Rheometric Expansion System at a temperature of 135° C. and 0.25% strain, to determine the melt flow properties of peroxide containing compositions. V0.1 and V100 are the viscosities at 0.1 and 100 rad s$^{-1}$, respectively (with V0.1/V100 being a measure of shear thinning characteristics).

Extensional viscosity is measured using an ARES FCU Rheometer with Extensional Viscosity Fixture Geometry and TA Orchestrator software on peroxide containing compositions. The test is conducted at a rate of 1/sec at 135° C. to simulate extrusion conditions. The maximum ("peak") value of viscosity attained is reported, as well as the viscosity at Hencky Strain of 1.

Zero shear viscosity is measured from creep recovery (SR-200, 25.0 Pa/3 minutes creep/15 minutes recovery/135° C.) on peroxide containing compositions.

Moving Die Rheometer (MDR) analyses are performed on the compounds using Alpha Technologies Rheometer MDR model 2000 unit. Testing is based on ASTM procedure D 5289, "Standard Test Method for Rubber—Property Vulcanization Using Rotorless Cure Meters". The MDR analyses are performed using 6 grams of material. Samples are tested at 182° C. or at 140° C. at 0.5 degrees arc oscillation for both temperature conditions. Samples are tested on material directly from the BRABENDER™ mixing bowl. Resistance to premature crosslinking at extrusion conditions ("scorch") is assessed by ts0.25, ts0.65 or ts1 (times for 0.25, 0.65 or 1 lb-in increase in torque, respectively) at 140° C.

Ultimate degree of crosslinking is reflected by MH (maximum torque)–ML (minimum torque) at 182° C.

Gel content (insoluble fraction) is another measure of degree of crosslinking. It can be determined by extracting with the solvent decahydronaphthalene (decalin) according to ASTM D2765. It is applicable to crosslinked ethylene plastics of all densities, including those containing fillers, and all provide corrections for the inert fillers present in some of those compounds. The test is conducted on specimens that came out of the MDR experiments at 182° C. A WILEY mill is used (20 mesh screen) to prepare powdered samples, at least one gram of material for each sample. Fabrication of the sample pouches is crafted carefully to avoid leaks of the powdered samples from the pouch. In any technique used, losses of powder to leaks around the folds or through staple holes are to be avoided. The width of the finished pouch is no more than three quarters of an inch, and the length is no more than two inches. 120 mesh screens are used for pouches. The sample pouch is weighed on an analytical balance. 0.3 grams (+/0.02 g) of powdered samples is placed into the pouch. Since it is necessary to pack the sample into the pouch, care is given not to force open the folds in the pouch. The pouches are sealed and samples are then weighed. Samples are then placed into one liter of boiling decalin, with 10 g of 2,2'-methylene-bis (4-methyl-6-tertiary butyl phenol) for 6 hours using flasks in a heated mantle. After the decalin has boiled for six hours, the voltage regulator is turned off leaving the cooling water running until decalin has cooled below its flash point (this typically takes at least a half hour). When the decalin has cooled, the cooling water is turned off and the pouches removed from the flasks. The pouches are allowed to cool under a hood, to remove as much solvent as possible. Then the pouches are placed in a vacuum oven set at 150° C. for four hours, maintaining a vacuum of 25 inches of mercury. The pouches are then taken out of the oven and allowed to cool to room temperature. Weights are recorded on an analytical balance. The calculation for gel extraction is shown below where W1=weight of empty pouch, W2=weight of sample and pouch, W3=weight of sample, pouch and staple, and W4=weight after extraction.

$$\% \text{ extracted} = \left(\frac{W_3 - W_4}{W_2 - W_1}\right) \times 100$$
$$\text{Gel Content} = 100 - \% \text{ extracted}$$

Hot creep is another measure of the degree of crosslinking. Testing is based on the ICEA-T-28-562-2003 method for power cable insulation materials. Hot creep testing is conducted on 50 mil (1.3 mm) thick samples in an oven with a glass door at 200° C. with a force of 0.2 MPa stress applied to the bottom of the specimens. Three test specimens for each sample are cut using ASTM D 412 type D tensile bars. The samples are elongated for 15 minutes where the percentage increases in length are measured and the average values of the three specimens are reported as "hot creep".

Dissipation Factor (DF) testing at 60 Hz and 2 kV applied voltage is conducted on crosslinked 50 mil (1.3 mm) plaques. The plaques are degassed in a vacuum oven at 60° C. for five days. DF testing is carried out according to ASTM D150 at 60 Hz on a GUILDLINE High Voltage Capacitance Bridge unit, Model 9920A, with a TETTEX specimen holder and a TETTEX AG Instruments Temperature Control Unit. Samples are tested at 60 Hertz (Hz) and 2 kilovolts (kV) applied voltage at temperatures of 25° C., 40° C., 90° C. and 130° C.

Dissipation Factor (DF) testing is also conducted at 60 Hz and 8 kV applied voltage on crosslinked 10 mil (0.25 mm) plaques. The plaques are degassed in a vacuum oven at 60° C. for five days. Samples are tested at temperatures of 60° C., 100° C. and 120° C.

DF measurements at 130° C. (60 Hz, 2 kV) are typically used for low and medium voltage wire and cable applications. DF measurements at 100° C. (60 Hz, 8 kV) are typically used for high voltage wire and cable applications. DF measurements at 120° C. (60 Hz, 8 kV) are typically used for extra-high voltage wire and cable applications.

AC breakdown strength ("ACBD"), also known as AC dielectric strength, is tested with nominal 35-mil (0.9-mm) thick cured plaques on a BRINKMAN AC Dielectric Strength Tester using EXXON Univolt N61 transformer oil. Aged samples are aged in a glass U-tube filled with 0.01 M sodium chloride solution for twenty one days at 6 kV.

Shore D and Shore A hardness are determined at 23° C. in accordance with ASTM D 2240, on specimens of 250 mil (6.4 mm) thickness and 51 mm diameter, and the average of five measurements is recorded.

The chain transfer constant (Cs) values for some chain transfer agents are shown below in Table A showing chain transfer constants (Cs) derived by Mortimer at 130° C. and 1360 atmospheres (atm) for example chain transfer agents.

TABLE A

Cs-Values as Measured by Mortimer at 130° C. and 1360 atm in References 2 and 3

| CTA | Cs at 130° C. and 1360 atm |
| --- | --- |
| propane | 0.0030 |
| iso-butane | 0.0072 |
| propylene | 0.0122 |
| iso-propanol | 0.0144 |
| acetone | 0.0168 |
| 1-butene | 0.047 |
| methyl ethyl ketone | 0.060 |
| propionaldehyde | 0.33 |
| tert-butanethiol | 15 |

Ref No. 1. G. Mortimer; Journal of Polymer Science: Part A-1; Chain transfer in ethylene polymerization; vol 4, p 881-900 (1966)

Ref No. 2. G. Mortimer; Journal of Polymer Science: Part A-1; Chain transfer in ethylene polymerization. Part Iv. Additional study at 1360 atm and 130° C.; vol 8, p 1513-1523 (1970)

Ref No. 3. G. Mortimer; Journal of Polymer Science: Part A-1; Chain transfer in ethylene polymerization. Part VII. Very reactive and depletable transfer agents; Vol 10, p 163-168 (1972)

Examples 1 to 3, 3A to 3D and Comparative Examples 1 to 3, 3A: Polymer Properties and Extrusion Characteristics The data are presented in Tables 1 and 2. The values of terminal vinyls per 1000 carbon atoms (in Table 1) were determined by nuclear magnetic resonance (NMR). Relative to the conventional LDPE of Comparative Examples 1 to 3 (of 12 greater than 2 dg/min), the PPG AEMA modified LDPE of Examples 1 to 3 (also of 12 greater than 2 dg/min)

exhibited the following properties which are all desirable for formulated power cable insulations: similar or broader molecular weight distribution, similar or greater shear thinning, lower viscosity at 10 s$^{-1}$, and higher melt strength. Furthermore, Examples 3A to 3D (LDPE without branching agent and of 12 less than 2 dg/min) exhibited broader molecular weight distribution, greater shear thinning, lower or similar viscosities at 100 s$^{-1}$, and higher melt strength than conventional LDPE of Comparative Example 3A (also of 12 less than 2 dg/min). Notably, the values of parameter C of the examples of this invention were all significantly greater than those of the comparative examples. The improved melt rheological characteristics of PPG AEMA modified LDPE of Examples 2 and 3 result in lower melt temperatures than LDPE of Comparative Examples 2 and 3 (of similar 12 values) during extrusion at screw speeds ranging from 75 to 100 revolutions per minute (rpm) on a 2.5 inch 24:1 L/D extruder with Maddock screw. Similarly, the LDPE of Example 3B (without branching agent) yields lower melt temperatures than the LDPE of Comparative Example 3A (in spite of the latter being of higher 12 value) during extrusion at screw speed of 100 rpm on a 2.5 inch 24:1 L/D extruder with Maddock screw. In fact, the LDPE of Example 3C (without branching agent and of fractional 12 value) only resulted in slightly higher melt discharge temperatures than the LDPE of Comparative Example 3A. A lower melt temperature is considered desirable so as to avoid premature crosslinking during extrusion of insulation compounds containing peroxides. Consequently, the extrusion rates corresponding to a melt temperature of 137° C. (close to the maximum of 140-150° C. practiced industrially with compositions containing dicumyl peroxide) are generally relatively greater with the examples of this invention (Examples 2 and 3 versus Comparative Examples 2 and 3; and Example 3B versus Comparative Example 3A). In the case of Example 3C, although there was a reduction in the extrusion rate corresponding to a melt discharge temperature of 137° C., it did exhibit the highest melt strength of all the polymers in Table 1. Example 3D also yielded acceptably high extrusion rate at the melt discharge of 137° C., and had exceptionally high melt strength.

Examples 4 to 6 and Comparative Example 4: Dissipation Factors of Peroxide Crosslinked Polymers Dicumyl peroxide is imbibed in the polymers of Examples 1 to 3 and Comparative Example 1, and the compositions are crosslinked by compression molding at elevated temperatures. The procedure used for peroxide incorporation in the polymers is as follows: the polymer pellets are heated in a glass jar at 50° C. for 2 hours; the dicumyl peroxide is melted by heating to 60° C. and sprayed onto the pre-heated pellets using a syringe; the jar is tumble blended for 10 minutes at room temperature (23° C.), placed in an oven at 50° C. for 16 hours, removed from oven and tumble blended again at room temperature for 10 minutes.

The compositions are subsequently compression molded at the following conditions to make specimens of appropriate dimensions: 500 pounds per square inch (psi) (3.5 megapascals (MPa)) at 125° C. for 3 minutes, followed by 2500 psi (17 MPa) at 180° C. for 20 minutes, cooling to 30° C. at this pressure, and opening the press to remove molded plaques.

Dissipation factors of the specimens are measured (Table 3). Surprisingly, in spite of the polar comonomer incorporated in PPG AEMA modified LDPE, the dissipation factors of the compositions or crosslinked polymers of Examples 4 to 6 are not higher than that of Comparative Example 4 (or, the dissipation factors of the compositions or crosslinked polymers of Examples 4 to 6 are similar to or lower than that of Comparative Example 4).

Examples 7 to 12, 12A to 12F and Comparative Examples 5 to 8, 8A to 8C: Crosslinking Characteristics and Dissipation Factors of Polyethylene Glycol (PEG) Based Insulation Compositions The polymers of Examples 1 to 3, 3A to 3D and Comparative Examples 1 to 2, 3A are used to make the insulation compositions shown in Table 4. The dicumyl peroxide is melted by heating to 60° C. and mixed with Nofmer MSD at a 5:1 ratio (of peroxide to Nofmer MSD). A "solids" mixture is made by mixing everything (except peroxide and Nofmer MSD) in a container by hand. This mixture is subsequently compounded in a 250 cc BRABENDER™ batch mixer with cam rotors at 190° C. and 40 rpm for 5 minutes. The blend is removed from the mixer, cold pressed into thin sheet, cut into strips and fed through a pelletizer to make pellets. The polymer pellets are heated in a glass jar at 60° C. for 2 hours and subsequently sprayed with stipulated amount of peroxide/Nofmer MSD mixture using a syringe. The jar is tumble blended for 5 to 10 minutes at room temperature, and placed at 60° C. for 16 hours. Next, the contents of the jar are mixed in a 250 cm$^3$ BRABENDER™ mixing bowl with cam rotors, at 120° C. and 30 rpm for 10 minutes (after loading).

The compositions are subsequently tested in a moving die rheometer at 140° C. or 182° C. (for evaluation of crosslinking characteristics). For melt rheological measurements, the compositions are compression molded at the following conditions to prevent significant crosslinking: 500 psi (3.5 MPa) at 120° C. for 3 minutes, followed by 2500 psi (17 MPa) at this temperature for 3 minutes, cooling to 30° C. at this pressure, and opening the press to remove the molded plaque. For electrical and mechanical measurements, the compositions are compression molded at the following conditions to make completely crosslinked specimens of different dimensions: 500 psi (3.5 MPa) at 125° C. for 3 minutes, followed by 2500 psi (17 MPa) at 180° C. for 20 minutes, cooling to 30° C. at this pressure, and opening the press to remove the molded plaque.

The compositions comprising the LDPE of Examples 1 to 3, 3A to 3D (PPG AEMA modified LDPE as well as without branching agent) are of similar or lower viscosities at extrusion conditions (V100 at 135° C. and 100 s$^{-1}$) than the comparative LDPE, with acceptably high shear-thinning (V0.1/V100) and extensional viscosities or zero shear viscosities (the latter properties for sag-resistance). Furthermore, the crosslinking characteristics of the compositions comprising the LDPE of Examples 1 to 3, 3A to 3D (PPG AEMA modified LDPE as well as without branching agent) are usually similar to or better than those of the comparative examples (Table 4). However, comparing Example 7 with Comparative Example 5 (both of similar degrees of ultimate crosslinking as measured by MH-ML at 182° C.), PPG AEMA modified LDPE yielded longer scorch times (ts0.25, ts0.65 or ts1 at 140° C.). The dissipation factors of the compositions are also desirably low, and not affected by the presence of the polar moiety in PPG AEMA modified LDPE. The hardness values of the specimens are generally similar. Noteworthy is the fact that Examples 12E and 12F yielded similar values of hot creep (ultimate crosslinking) and ts0.25/ts0.65/ts1 at 140° C. (propensity for scorch at extrusion temperature) as comparative examples 8B and 8C, but with desirably lower shear viscosities at 135° C. (extrusion condition) as well as greater values of zero shear viscosity and extensional viscosity at 135° C. (i.e., superior resistance to insulation sag at cable extrusion conditions). In all cases, the values of AC breakdown strength (unaged and aged) were greater than or equal to 30 kV/mm.

Examples 13 to 15, 15A to 15E and Comparative Examples 9 to 10, 10A to 10B: Crosslinking Characteristics and Dissipation Factors of Insulation Compositions without PEG The polymers of Examples 1 to 3, 3A to 3D and Comparative Examples 1 to 2, 3A are used to make the insulation compositions shown in Table 5. The dicumyl peroxide is melted by heating to 60° C. A "solids" mixture is made by mixing everything (except peroxide) in a container by hand. This mixture is subsequently compounded in a 250 cc BRABENDER™ batch mixer with cam rotors at 190° C. and 40 rpm for 5 minutes. The blend is removed from the mixer, cold pressed into thin sheet, cut into strips and fed through a pelletizer to make pellets. The polymer pellets are heated in a glass jar at 60° C. for 2 hours and subsequently sprayed with stipulated amount of peroxide using a syringe. The jar is tumble blended for 10 minutes at room temperature, and placed at 60° C. for 16 hours. Next, the contents of the jar are mixed in a 250 cm³ BRABENDER™ mixing bowl with cam rotors, at 120° C. and 30 rpm for 10 minutes (after loading).

The compositions are subsequently tested in a moving die rheometer at 140° C. or 182° C. (for evaluation of crosslinking characteristics). For melt rheological measurements, the compositions are compression molded at the following conditions to prevent significant crosslinking: 500 psi (3.5 MPa) at 120° C. for 3 minutes, followed by 2500 psi (17 MPa) at this temperature for 3 minutes, cooling to 30° C. at this pressure, and opening the press to remove the molded plaque. For electrical and mechanical measurements, the compositions are compression molded at the following conditions to make completely crosslinked specimens of different dimensions: 500 psi (3.5 MPa) at 125° C. for 3 minutes, followed by 2500 psi (17 MPa) at 180° C. for 20 minutes, cooling to 30° C. at this pressure, and opening the press to remove the molded plaque.

The compositions comprising LDPE of Examples 1 to 3, 3A to 3D (PPG AEMA modified LDPE as well as without branching agent) are of similar or lower viscosities at extrusion conditions (V100 at 135° C. and 100 s$^{-1}$) than the comparative LDPE, with acceptably high shear-thinning (V0.1/V100) and extensional viscosities or zero shear viscosities (the latter properties for sag-resistance). Furthermore, the examples of this invention exhibited varying and satisfactory crosslinking characteristics, as well as desirably (acceptably) low dissipation factors. The hardness values of the specimens were generally similar. In particular, Examples 15B and 15C yielded similar values of hot creep (ultimate crosslinking) as comparative example 10, but with similar or lower shear viscosities at 135° C. (extrusion condition), desirably higher ts1 at 140° C. (i.e., less propensity for scorch at extrusion temperature) and greater values of zero shear viscosity and extensional viscosity at 135° C. (i.e., superior resistance to insulation sag at cable extrusion conditions). Furthermore, Example 15E yielded similar value of hot creep (ultimate crosslinking) as comparative examples 10A and 10B, but with desirably greater ts0.25/ts0.65/ts1 values at 140° C. (i.e., decreased propensity for scorch at extrusion temperature) and lower shear viscosity at 135° C. (extrusion condition), as well as greater values of zero shear viscosity and extensional viscosity at 135° C. (i.e., superior resistance to insulation sag at cable extrusion conditions). In all cases, the values of AC breakdown strength (unaged and aged) were greater than or equal to 30 kV/mm.

TABLE 1

Polymers and Their Properties

|  | Ex. 1 (PPG AEMA Modified LDPE- Tubular Reactor) | Ex. 2 (PPG AEMA Modified LDPE- Tubular Reactor) | Ex. 3 (PPG AEMA Modified LDPE- Tubular Reactor) | Ex. 3A (LDPE without Branching Agent- Tubular Reactor) | Ex. 3B (LDPE without Branching Agent- Tubular Reactor) | Ex. 3C (LDPE without Branching Agent- Tubular Reactor) |
|---|---|---|---|---|---|---|
| Density g/cc | 0.924 | 0.924 | 0.920 | 0.919 | 0.920 | 0.919 |
| I$_2$ dg/min (190° C.) | 2.9 | 3.2 | 3.8 | 1.2 | 1.4 | 0.7 |
| Melt Strength (cN) at 190° C. | 10.3 | 8.9 | 7.4 | 20.7 | 12.4 | 24.2 |
| TDGPC- M$_w$ (abs)/ M$_n$ (abs) | 13.3 | 11.9 | 10.2 | 19.0 | 17.5 | 17.1 |
| V0.1/V100 (190° C.) | 15.4 | 13.9 | 13.1 | 28.3 | 22.4 | 34.2 |
| V100 at 190° C. (Pa s) | 359 | 355 | 360 | 457 | 485 | 543 |
| Terminal vinyls/1000 carbon atoms | 0.128 | 0.152 | Not Available | 0.063 | 0.11 | 0.049 |
| Value of Parameter C* | 24.6 | 23.2 | 23.1 | 29.7 | 18.9 | 29.9 |

TABLE 1-continued

|  | Ex. 3D (LDPE without Branching Agent-Tubular Reactor) | CE 1 (Conventional LDPE-Tubular Reactor) | CE 2 (Conventional LDPE-Tubular Reactor) | CE 3 (Conventional LDPE-Tubular Reactor) | CE 3A (Conventional LDPE-Tubular Reactor) |
|---|---|---|---|---|---|
| Density g/cc | 0.920 | 0.924 | 0.920 | 0.920 | 0.921 |
| $I_2$ dg/min (190° C.) | 0.5 | 4.1 | 2.7 | 3.7 | 1.7 |
| Melt Strength (cN) at 190° C. | 16.8 | 4.3 | 6.2 | 4.5 | 8.4 |
| TDGPC-$M_w$ (abs)/$M_n$ (abs) | 21.8 | 8.1 | 10.0 | 9.6 | 7.9 |
| V0.1/V100 (190° C.) | 36.1 | 9.1 | 12.6 | 10.3 | 16.9 |
| V100 at 190° C. (Pa s) | 620 | 368 | 426 | 386 | 579 |
| Terminal vinyls/1000 carbon atoms | 0.082 | 0.025 | 0.280 | 0.293 | 0.279 |
| Value of Parameter C* | 19.5 | 14.7 | 13.9 | 13.7 | 14.0 |

Ex.: Example
CE: Comparative Example
*Melt strength = C$e^{-0.3 \text{ (melt index with 2.16 kg load)}}$

TABLE 2

Extrusion Characteristics of Representative Polymers of Table 1

|  | Example 2 (PPG AEMA Modified LDPE-Tubular Reactor) | Example 3 (PPG AEMA Modified LDPE-Tubular Reactor) | Example 3B (LDPE without Branching Agent-Tubular Reactor) | Example 3C (LDPE without Branching Agent-Tubular Reactor) | Example 3D (LDPE without Branching Agent-Tubular Reactor) | Comparative Example 2 (Conventional LDPE-Tubular Reactor) | Comparative Example 3 (Conventional LDPE-Tubular Reactor) | Comparative Example 3A (Conventional LDPE-Tubular Reactor) |
|---|---|---|---|---|---|---|---|---|
| Melt Temperature During Extrusion (° C.) | | | | | | | | |
| 25 rpm | 121.7 | 120.0 | 123.9 | 126.7 | 126.7 | 121.9 | 120.6 | 121.1 |
| 50 rpm | 130.0 | 131.1 | 131.7 | 137.2 | 136.7 | 131.7 | 131.1 | 133.3 |
| 75 rpm | 134.4 | 135.0 | 141.1 | 145.0 | 147.8 | 137.2 | 135.6 | 141.1 |
| 100 rpm | 137.8 | 138.9 | 146.1 | 151.1 | 154.4 | 143.3 | 141.1 | 148.3 |
| Extrusion Rate (lb/h) | | | | | | | | |
| 25 rpm | 45.3 | 46.2 | 42.4 | 41.4 | 41.6 | 43.4 | 42.0 | 42.8 |
| 50 rpm | 86.4 | 83.4 | 89.4 | 88.2 | 88.2 | 85.8 | 84.0 | 89.4 |
| 75 rpm | 130.2 | 131.4 | 140.4 | 138.0 | 139.2 | 132.0 | 132.6 | 140.4 |
| 100 rpm | 184.8 | 184.8 | 191.4 | 186.6 | 188.4 | 189.6 | 188.4 | 192.6 |
| Extrusion Rate at Melt Temperature of 137° C. (lb/h) | 173 | 159 | 120 | 88 | 90 | 131 | 147 | 114 |

TABLE 3

Dissipation Factors of Peroxide Crosslinked Polymers

| Composition (wt %) | Ex. 4 | Ex. 5 | Ex. 6 | CE 4 |
|---|---|---|---|---|
| PPG AEMA Modified LDPE (Example 1) | 98.2 | | | |
| PPG AEMA Modified LDPE (Example 2) | | 98.2 | | |
| PPG AEMA Modified LDPE (Example 3) | | | 98.2 | |
| Conventional LDPE (Comparative Example 1) | | | | 98.2 |
| PERKADOX ™ BC-FF Dicumyl Peroxide | 1.8 | 1.8 | 1.8 | 1.8 |
| Total | 100.00 | 100.00 | 100.00 | 100.00 |
| Dissipation Factor at 130° C., 60 Hz, 2 kV (%)-After Crosslinking | 0.3 | 0.3 | 0.2 | 0.3 |
| Dissipation Factor at 120° C., 60 Hz, 8 kV (%)-After Crosslinking | 2.0 | 2.7 | 1.6 | 2.6 |
| Dissipation Factor at 100° C., 60 Hz, 8 kV (%)-After Crosslinking | 0.8 | 0.9 | 1.0 | 0.8 |

TABLE 4

Rheological Properties, Crosslinking Characteristics, Dissipation Factors and Hardness of Insulation Compositions with PEG

| Composition (wt %) | Ex. 7 | Ex. 8 | Ex. 9 | Ex. 10 | Ex. 11 | Ex. 12 | Ex. 12A | Ex. 12B | Ex. 12C | Ex. 12D | Ex. 12E | Ex. 12F |
|---|---|---|---|---|---|---|---|---|---|---|---|---|
| PPG AEMA Modified LDPE (Example 1) | 96.36 | | | | | | | | | | | |
| PPG AEMA Modified LDPE (Example 2) | | 97.08 | | | 97.08 | | | | | | | |
| PPG AEMA Modified LDPE (Example 3) | | | 97.20 | 98.04 | | 97.08 | | | | | | |
| LDPE without Branching Agent (Example 3A) | | | | | | | 96.48 | | | | | |
| LDPE without Branching Agent (Example 3B) | | | | | | | | 96.48 | | | | |
| LDPE without Branching Agent (Example 3C) | | | | | | | | | 96.48 | | | |
| LDPE without Branching Agent (Example 3D) | | | | | | | | | | 96.48 | | |
| Conventional LDPE (CE 1) | | | | | | | | | | | 96.48 | |
| Conventional LDPE (CE 2) | | | | | | | | | | | | 96.48 |
| Conventional LDPE (CE 3A) | | | | | | | | | | | | |
| PERKADOX ™ BC-FF Dicumyl Peroxide | 2.10 | 1.50 | 1.40 | 0.70 | 1.50 | 1.50 | 2.00 | 2.00 | 2.00 | 2.00 | 2.00 | 2.00 |
| PEG 20000 (Clariant Polyglykol 20000 SRU) | 0.58 | 0.58 | 0.58 | 0.58 | 0.58 | 0.58 | 0.58 | 0.58 | 0.58 | 0.58 | 0.58 | 0.58 |
| LOWINOX ™ TBM-6 | 0.34 | 0.34 | 0.34 | 0.34 | 0.34 | 0.34 | 0.34 | 0.34 | 0.34 | 0.34 | 0.34 | 0.34 |
| SABOSTAB ™ UV 119 | 0.20 | 0.20 | 0.20 | 0.20 | 0.20 | 0.20 | 0.20 | 0.20 | 0.20 | 0.20 | 0.20 | 0.20 |
| Nofmer MSD (AMSD) | 0.42 | 0.30 | 0.28 | 0.14 | 0.30 | 0.30 | 0.40 | 0.40 | 0.40 | 0.40 | 0.40 | 0.40 |
| Total | 100 | 100 | 100 | 100 | 100 | 100 | 100 | 100 | 100 | 100 | 100 | 100 |

TABLE 4-continued

Rheological Properties, Crosslinking Characteristics, Dissipation Factors and Hardness of Insulation Compositions with PEG

| Composition (wt %) | CE 5 | CE 6 | CE 7 | CE 8 | CE8 A | CE 8B | CE 8C |
|---|---|---|---|---|---|---|---|
| PPG AEMA Modified LDPE (Example 1) | | | | | | | |
| PPG AEMA Modified LDPE (Example 2) | | | | | | | |
| PPG AEMA Modified LDPE (Example 3) | | | | | | | |
| LDPE without Branching Agent (Example 3A) | | | | | | | |
| LDPE without Branching Agent (Example 3B) | | | | | | | |
| LDPE without Branching Agent (Example 3C) | | | | | | | |
| LDPE without Branching Agent (Example 3D) | | | | | | | |
| Conventional LDPE (CE 1) | 96.36 | | | | | | |
| Conventional LDPE (CE 2) | | 97.20 | | | | | |
| Conventional LDPE (CE 3A) | | | 98.04 | | | | |
| PERKADOX ™ BC-FF Dicumyl Peroxide | 2.10 | 1.40 | 0.70 | 97.08 | 96.48 | 96.48 | 96.48 |
| | | | | 1.50 | 2.00 | 2.00 | 2.00 |
| PEG 20000 (Clariant Polyglykol 20000 SRU) | 0.58 | 0.58 | 0.58 | 0.58 | 0.58 | 0.58 | 0.58 |
| LOWINOX ™ TBM-6 | 0.34 | 0.34 | 0.34 | 0.34 | 0.34 | 0.34 | 0.34 |
| SABOSTAB ™ UV 119 | 0.20 | 0.20 | 0.20 | 0.20 | 0.20 | 0.20 | 0.20 |
| Nofmer MSD (AMSD) | 0.42 | 0.28 | 0.14 | 0.30 | 0.40 | 0.40 | 0.40 |
| Total | 100 | 100 | 100 | 100 | 100 | 100 | 100 |

TABLE 4-continued

Rheological Properties, Crosslinking Characteristics, Dissipation Factors and Hardness of Insulation Compositions with PEG

| Properties | Ex. 7 | Ex. 8 | Ex. 9 | Ex. 10 | Ex. 11 | Ex. 12 | Ex. 12A | Ex. 12B | Ex. 12C | Ex. 12D | Ex. 12E | Ex. 12F |
|---|---|---|---|---|---|---|---|---|---|---|---|---|
| V0.1/V100 (135° C.) | NA | 40.7 | NA | NA | 36.8 | 37.7 | 48.0 | 66.0 | 68.7 | 60.4 | 82.8 | 80.0 |
| V100 at 135° C. (Pa s) | NA | 628 | NA | NA | 605 | 617 | 617 | 698 | 539 | 617 | 588 | 648 |
| Extensional Viscosity at 135° C., 1 s$^{-1}$ and Hencky Strain of 1 (Poise) | NA | 263230 | NA | NA | 254780 | 297170 | 315730 | 779340 | 683430 | 618870 | 812240 | 1,200,200 |
| Maximum Extensional Viscosity at 135° C., 1 s$^{-1}$ (Poise) | NA | 3,805,100 | NA | NA | 4,605,000 | 3,816,200 | 7,792,900 | 4,146,900 | 8,346,100 | 5,289,300 | 14,127,000 | 6,510,000 |
| Zero Shear Viscosity at 135° C. (Pa s) | NA | 19010 | NA | NA | 15700 | 19090 | 20550 | 33740 | 38790 | 31110 | 47200 | 63370 |
| MDR: ts 0.25 at 140° C. (minutes) | 27 | 37 | NA | 226 | 32 | 32 | 21 | 24 | 20 | 21 | 19 | 20 |
| MDR: ts 0.65 at 140° C. (minutes) | 56 | 109 | NA | NM | 85 | 84 | 46 | 50 | 48 | 46 | 42 | 43 |
| MDR: ts 1 at 140° C. (minutes) | 84 | NM | NA | NM | NM | NM | 68 | 74 | 75 | 67 | 62 | 64 |
| MDR: MH-ML at 182° C. (lb in) | 2.36 | 1.21 | 1.14 | 0.31 | 1.35 | 1.57 | 2.71 | 2.37 | 2.23 | 2.48 | 2.84 | 2.65 |
| Hot creep at 200° C., 0.2 MPa (%)-after crosslinking | NA | NM | NM | NM | NM | NM | 88 | 95 | 91 | 91 | 67 | 74 |
| Gel content (wt %)-after crosslinking | 80 | 67 | 71 | 32 | 66 | 71 | 79 | 81 | 82 | 81 | 84 | 84 |
| Dissipation Factor at 130° C., 60 Hz, 2 kV (%)-after crosslinking | NA | 0.07 | NA | NA | 0.08 | 0.08 | 0.07 | 0.06 | 0.09 | 0.07 | 0.10 | 0.07 |

TABLE 4-continued

Rheological Properties, Crosslinking Characteristics, Dissipation Factors and Hardness of Insulation Compositions with PEG

| | | | | | | | | | | | |
|---|---|---|---|---|---|---|---|---|---|---|---|
| Hardness (Shore D)-after crosslinking | NA | 47.2 | NA | 46.1 | 41.2 | 44.0 | 43.7 | NA | NA | NA | NA |
| Hardness (Shore A)-after crosslinking | NA | 95.3 | NA | 97.3 | 96.6 | 96.2 | 93.0 | NA | NA | NA | NA |

| Properties | CE 5 | CE 6 | CE 7 | CE 8 | CE 8A | CE 8B | CE 8C |
|---|---|---|---|---|---|---|---|
| V0.1/V100 (135° C.) | NA | NA | NA | 38.4 | 40.5 | 55.1 | 49.7 |
| V100 at 135° C. (Pa s) | NA | NA | NA | 730 | 699 | 834 | 814 |
| Extensional Viscosity at 135° C., 1 s⁻¹ and Hencky Strain of 1 (Poise) | NA | NA | NA | 364860 | 340180 | 511640 | 460410 |
| Maximum Extensional Viscosity at 135° C., 1 s⁻¹ (Poise) | NA | NA | NA | 3,451,400 | 6,231,700 | 4,064,100 | 3,529,900 |
| Zero Shear Viscosity at 135° C. (Pa s) | NA | NA | NA | 21310 | 20280 | 26650 | 29670 |
| MDR: ts 0.25 at 140° C. (minutes) | 26 | 44 | 147 | 33 | 24 | 19 | 21 |
| MDR: ts 0.65 at 140° C. (minutes) | 52 | 111 | NM | 81 | 50 | 42 | 45 |
| MDR: ts 1 at 140° C. (minutes) | 74 | NM | NM | NM | 72 | 63 | 67 |
| MDR: MH-ML at 182° C. (lb in) | 2.24 | 1.00 | 0.28 | 1.49 | 2.83 | 2.92 | 3.00 |
| Hot creep at 200° C., 0.2 MPa (%)-after crosslinking | NA | NM | NM | NM | 88 | 77 | 75 |

TABLE 4-continued

Rheological Properties, Crosslinking Characteristics, Dissipation Factors and Hardness of Insulation Compositions with PEG

| | | | | | | | |
|---|---|---|---|---|---|---|---|
| Gel content (wt %)-after crosslinking | 80 | 63 | 32 | 70 | 79 | 79 | 85 |
| Dissipation Factor at 130° C., 60 Hz, 2 kV (%)-after crosslinking | NA | NA | NA | 0.07 | 0.07 | 0.06 | 0.09 |
| Hardness (Shore D)-after crosslinking | NA | NA | NA | 44.4 | 44.6 | 45.5 | NA |
| Hardness (Shore A)-after crosslinking | NA | NA | NA | 96.4 | 97.0 | 97.7 | NA |

NM: Not measurable (not enough peroxide for torque to increase by 0.25 or 0.65 or 1.0 lb in; or not enough crosslinking for hot creep to be measurable)
NA: Not available

TABLE 5

Rheological Properties, Crosslinking Characteristics, Dissipation Factors and Hardness of Insulation Compositions (Without PEG)

| | Ex. 13 | Ex. 14 | Ex. 15 | Ex. 15A | Ex. 15B | Ex. 15C | Ex. 15D | Ex. 15E |
|---|---|---|---|---|---|---|---|---|
| Composition (wt %) | | | | | | | | |
| PPG AEMA Modified LDPE (Example 1) | 97.88 | | | | | | | |
| PPG AEMA Modified LDPE (Example 2) | | 97.88 | | | | | | |
| PPG AEMA Modified LDPE (Example 3) | | | 97.88 | | | | | |
| LDPE without Branching Agent (Example 3A) | | | | 97.88 | 97.88 | | | |
| LDPE without Branching Agent (Example 3B) | | | | | | 97.88 | | |
| LDPE without Branching Agent (Example 3C) | | | | | | | 97.88 | |
| LDPE without Branching Agent (Example 3D) | | | | | | | | 97.88 |
| Conventional LDPE (Comparative Example 1) | | | | | | | | |
| Conventional LDPE (Comparative Example 2) | | | | | | | | |
| Conventional LDPE (CE 3A) | | | | | | | | |
| PERKADOX ™ BC-FF Dicumyl Peroxide | 1.75 | 1.75 | 1.75 | 1.75 | 1.75 | 1.75 | 1.75 | 1.75 |
| CYANOX ™ 2212 | 0.37 | 0.37 | 0.37 | 0.37 | 0.37 | 0.37 | 0.37 | 0.37 |
| Total | 100.00 | 100.00 | 100.00 | 100.00 | 100.00 | 100.00 | 100.00 | 100.00 |
| Properties | | | | | | | | |
| V0.1/V100 (135° C.) | 75.2 | 77.6 | 73.3 | 102.4 | 78.9 | 70.5 | 93.1 | 94.8 |
| V100 at 135° C. (Pa s) | 654 | 696 | 636 | 757 | 596 | 782 | 712 | 721 |
| Extensional Viscosity at 135° C., 1 s$^{-1}$ and Hencky Strain of 1 (Poise) | 426710 | 293300 | 264090 | 1,089,100 | 616440 | 606460 | 724190 | 1,575,200 |
| Maximum Extensional Viscosity at 135° C., 1 s$^{-1}$ (Poise) | 14,526,000 | 4,872,700 | 5,742,500 | 9,744,600 | 7,648,000 | 6,590,500 | 8,322,300 | 6,429,400 |
| Zero Shear Viscosity at 135° C. (Pa s) | 25390 | 17510 | 15820 | 47350 | 36700 | 35560 | 57040 | 57670 |
| MDR: ts 0.25 at 140° C. (minutes) | 14.5 | 11.7 | 10.0 | 14.3 | 15.5 | 25.5 | 15.0 | 13.5 |
| MDR: ts 0.65 at 140° C. (minutes) | 38.5 | 32.5 | 22.5 | 33.5 | 34.5 | 56.0 | 35.0 | 31.0 |
| MDR: ts 1 at 140° C. (minutes) | 65.3 | 57.2 | 34.2 | 52.6 | 53.4 | 88.2 | 54.6 | 46.1 |
| MDR: MH-ML at 182° C. (lb in) | 1.52 | 1.52 | 2.46 | 2.04 | 2.00 | 2.15 | 2.00 | 2.30 |
| Gel content (wt %)-after crosslinking | 74 | 70 | 82 | 79 | 75 | 75 | 82 | 82 |

TABLE 5-continued

Rheological Properties, Crosslinking Characteristics, Dissipation Factors and Hardness of Insulation Compositions (Without PEG)

| | | | | | | | | |
|---|---|---|---|---|---|---|---|---|
| Hot creep at 200° C., 0.2 MPa (%)-after crosslinking | NM | NM | 111 | 138 | 104 | 100 | 138 | 89 |
| Dissipation Factor at 2 kV, 130° C., 60 Hz (%)-after crosslinking | 0.05 | 0.04 | 0.03 | NA | 0.02 | 0.02 | 0.02 | 0.02 |
| Dissipation Factor at 8 kV, 120° C., 60 Hz (%)-after crosslinking | 0.34 | 0.45 | 0.37 | 0.05 | 0.03 | 0.02 | 0.04 | 0.03 |
| Dissipation Factor at 8 kV, 100° C., 60 Hz (%)-after crosslinking | 0.10 | 0.11 | 0.10 | 0.03 | 0.02 | 0.01 | 0.02 | 0.01 |
| Hardness (Shore D)-after crosslinking | 46.0 | 46.5 | 44.0 | 46.3 | NA | NA | NA | NA |
| Hardness (Shore A)-after crosslinking | 96.9 | 96.0 | 95.4 | 97.4 | NA | NA | NA | NA |

| | CE 9 | CE 10 | CE 10A | CE 10B |
|---|---|---|---|---|
| Composition (wt %) | | | | |
| PPG AEMA Modified LDPE (Example 1) | | | | |
| PPG AEMA Modified LDPE (Example 2) | | | | |
| PPG AEMA Modified LDPE (Example 3) | | | | |
| LDPE without Branching Agent (Example 3A) | | | | |
| LDPE without Branching Agent (Example 3B) | | | | |
| LDPE without Branching Agent (Example 3C) | | | | |
| LDPE without Branching Agent (Example 3D) | | | | |
| Conventional LDPE (Comparative Example 1) | 97.88 | | | |
| Conventional LDPE (Comparative Example 2) | | 97.88 | | |
| Conventional LDPE (CE 3A) | | | 97.88 | 97.88 |
| PERKADOX ™ BC-FF Dicumyl Peroxide | 1.75 | 1.75 | 1.75 | 1.75 |
| CYANOX ™ 2212 | 0.37 | 0.37 | 0.37 | 0.37 |
| Total | 100.00 | 100.00 | 100.00 | 100.00 |
| Properties | | | | |
| V0.1/V100 (135° C.) | 75.8 | 53.1 | 83.1 | 62.2 |
| V100 at 135° C. (Pa s) | 729 | 754 | 802 | 888 |
| Extensional Viscosity at 135° C., 1 s$^{-1}$ and Hencky | 217160 | 338750 | 679640 | 492440 |

TABLE 5-continued

Rheological Properties, Crosslinking Characteristics, Dissipation Factors and Hardness of Insulation Compositions (Without PEG)

| | | | | |
|---|---|---|---|---|
| Strain of 1 (Poise) Maximum Extensional Viscosity at 135° C., 1 s$^{-1}$ (Poise) | 34,393,000 | 2,930,200 | 5,028,700 | 3,413,100 |
| Zero Shear Viscosity at 135° C. (Pa s) | 56820 | 27010 | 45320 | 26670 |
| MDR: ts 0.25 at 140° C. (minutes) | 22.0 | 16.0 | 11.3 | 12.0 |
| MDR: ts 0.65 at 140° C. (minutes) | 60.0 | 32.8 | 23.3 | 24.0 |
| MDR: ts 1 at 140° C. (minutes) | 106.6 | 47.6 | 33.7 | 34.3 |
| MDR: MH-ML at 182° C. (lb in) | 1.37 | 2.57 | 2.99 | 3.06 |
| Gel content (wt %)-after crosslinking | 73 | 84 | 83 | 82 |
| Hot creep at 200° C., 0.2 MPa (%)-after crosslinking | NM | 112 | 81 | 83 |
| Dissipation Factor at 2 kV, 130° C., 60 Hz (%)-after crosslinking | 0.03 | 0.02 | NA | 0.02 |
| Dissipation Factor at 8 kV, 120° C., 60 Hz (%)-after crosslinking | 0.11 | 0.03 | 0.02 | 0.02 |
| Dissipation Factor at 8 kV, 100° C., 60 Hz (%)-after crosslinking | 0.04 | 0.02 | 0.01 | 0.02 |
| Hardness (Shore D)-after crosslinking | 46.6 | 43.6 | 48.8 | NA |
| Hardness (Shore A)-after crosslinking | 95.6 | 94.0 | 96.8 | NA |

NM: Not measurable (not enough crosslinking for hot creep to be measurable)
NA: Not available

What is claimed is:

1. A process of making an insulated wire or cable, the process comprising the steps of:
   (A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:
      (1) a high melt strength ethylene-based polymer made in a tubular reactor and modified with at least one of PPG AEMA, a di- or higher functional (meth)acrylate, a monomeric chain transfer agent, or an asymmetrical polyene, and
      (2) a peroxide, and
   (B) crosslinking the modified, high melt strength ethylene-based polymer to form a crosslinked composition having gel content of greater than 30%.

2. The process of claim 1 in which the PPG AEMA is of the following formula:

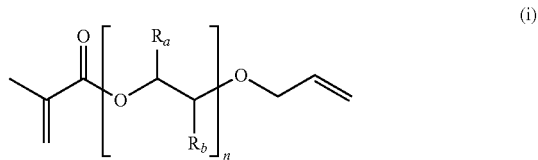

(i)

wherein n is from 1 to 50; $R_a$ is selected from hydrogen or an alkyl group; and $R_b$ is selected from hydrogen or an alkyl group; and the di- or higher functional (meth)acrylate is 1,4-butanediol dimethacrylate.

3. A process of making an insulated wire or cable, the process comprising the steps of:
   (A) extruding onto a covered or uncovered metal conductor or optical fiber a composition having a DF measured at 130° C. (60 Hz, 2 kV) or 120° C. (60 Hz, 8 kV) or 100° C. (60 Hz, 8 kV) of ≤0.5% and comprising:

(1) a branch modified, high melt strength ethylene homopolymer made in a tubular reactor by a process using (A) a tubular reactor comprising i (i≥3) reaction zones in which (1) the peak temperature of the first reaction zone is greater than the peak temperature in the $i^{th}$ reaction zone, and (2) the pressure in each reactor zone is less than or equal to (≤) 300 MPa, and (B) a chain transfer agent (CTA) that has a chain transfer constant (Cs) less than or equal to (≤) 0.5, and (2) a peroxide, and (B) crosslinking the branch modified, high melt strength ethylene homopolymer polymer to form a crosslinked composition having gel content of greater than 30%.

4. The process of claim 3 in which the chain transfer agent (CTA) has a chain transfer constant (Cs) less than or equal to (≤) 0.017.

5. The process of claim 1 in which the peroxide is an organic peroxide.

6. The process of claim 1 wherein the high melt strength ethylene-based polymer consists of (i) ethylene and (ii) at least one of the di- or higher functional (meth)acrylate, the monomeric chain transfer agent, or the asymmetrical polyene, as the only monomeric units.

7. The process of claim 1 wherein the high melt strength ethylene-based polymer, prior to crosslinking, has a density from 0.920 g/cc to 0.924 g/cc, and an n-hexane extractables content of less than 4.0 wt %.

* * * * *